United States Patent
Long et al.

(10) Patent No.: US 12,372,697 B2
(45) Date of Patent: Jul. 29, 2025

(54) OPTICAL DIFFUSER WITH HIGH INFRARED CLARITY

(71) Applicant: 3M INNOVATIVE PROPERTIES COMPANY, St. Paul, MN (US)

(72) Inventors: Fan Long, Guangzhou (CN); Huijie Xie, Beijing (CN); Jingfei Chen, Shanghai (CN); Zhe Hu, Suzhou (CN); John A. Wheatley, Stillwater, MN (US); Adam D. Haag, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 920 days.

(21) Appl. No.: 17/309,999

(22) PCT Filed: Feb. 2, 2019

(86) PCT No.: PCT/CN2019/074629
§ 371 (c)(1),
(2) Date: Jul. 9, 2021

(87) PCT Pub. No.: WO2020/155158
PCT Pub. Date: Aug. 6, 2020

(65) Prior Publication Data
US 2022/0091316 A1  Mar. 24, 2022

(51) Int. Cl.
*G02B 5/20* (2006.01)
*G02B 5/02* (2006.01)
(Continued)

(52) U.S. Cl.
CPC ............ *G02B 5/208* (2013.01); *G02B 5/0205* (2013.01); *G02B 5/0294* (2013.01); *G02B 27/288* (2013.01); *G02B 5/305* (2013.01)

(58) Field of Classification Search
None
See application file for complete search history.

(56) References Cited

U.S. PATENT DOCUMENTS 6,208,466 B1 *   3/2001   Liu .................... G02B 5/0252
                                              359/590
7,474,495 B2     1/2009   Weng
                          (Continued)

FOREIGN PATENT DOCUMENTS

JP      2008-268940      11/2008
WO      WO 2011-151388   12/2011
                         (Continued)

OTHER PUBLICATIONS

International Search report for PCT International Application No. PCT/CN2019/074629 mailed on Oct. 28, 2019, 7 pages.

Primary Examiner — Derek S. Chapel
(74) Attorney, Agent, or Firm — Clifton F. Richardson; Robert S. Moshrefzadeh; Jonathan L. Tolstedt

(57) ABSTRACT

An optical stack (100) includes an optical diffuser (10) and a first reflective polarizer (40) disposed on the optical diffuser (10). For substantially normally incident light and for nonoverlapping first and second wavelength ranges, the optical diffuser (10) has a first scattering rate R1 for at least one wavelength in the first wavelength range, and a second scattering rate R2 for at least one wavelength in the second wavelength range, such that R1/R2 is greater than or equal to 2. The first reflective polarizer (40) may transmit at least 40% of light for a first polarization state for each wavelength in the first wavelength range, may reflect at least 70% of light for an orthogonal second polarization state for each wavelength in the first wavelength range, and transmit at least 40% of light for each of the first and second polarization states and for each wavelength in the second wavelength range.

12 Claims, 15 Drawing Sheets

(51) Int. Cl.
*G02B 5/30* (2006.01)
*G02B 27/28* (2006.01)

(56) References Cited

U.S. PATENT DOCUMENTS

| | | |
|---|---|---|
| 9,158,155 B2 | 10/2015 | Weber |
| 9,880,328 B2 | 1/2018 | Gollier |
| 10,620,745 B2 | 4/2020 | He |
| 11,054,556 B2 | 7/2021 | Wheatley et al. |
| 11,960,683 B2 * | 4/2024 | Acharya ............... G06F 3/0421 |
| 2005/0024726 A1 * | 2/2005 | Ouderkirk ............... B32B 27/36 |
| | | 359/489.01 |
| 2013/0094088 A1 | 4/2013 | Merrill |
| 2016/0085101 A1 | 3/2016 | Saitoh |
| 2016/0231472 A1 | 8/2016 | Murgai |
| 2017/0123122 A1 | 5/2017 | Ballif |
| 2019/0025481 A1 | 1/2019 | Du et al. |
| 2019/0254811 A1 | 8/2019 | Emken et al. |
| 2020/0103576 A1 | 4/2020 | Johnson |
| 2023/0228919 A1 * | 7/2023 | Sousa ...................... G02B 1/04 |
| | | 359/599 |
| 2023/0252817 A1 * | 8/2023 | Rosen ................ G02F 1/13338 |
| | | 349/12 |
| 2024/0256088 A1 * | 8/2024 | Acharya ............... G06F 3/0421 |

FOREIGN PATENT DOCUMENTS

| | | | |
|---|---|---|---|
| WO | WO 2017-124664 | 7/2017 | |
| WO | WO-2017127734 A1 * | 7/2017 | ............. G02B 5/204 |

\* cited by examiner

OPTICAL DIFFUSER WITH HIGH INFRARED CLARITY

SUMMARY

In some aspects of the present description, an optical stack is provided, the optical stack including an optical diffuser and a first reflective polarizer disposed on the optical diffuser. For substantially normally incident light and for nonoverlapping first and second wavelength ranges, the first wavelength range extending at least from about 450 nm to about 600 nm, and the second wavelength range extending at least from about 800 nm to about 1200 nm: the optical diffuser has a first scattering rate R1 for at least one wavelength in the first wavelength range, and a second scattering rate R2 for at least one wavelength in the second wavelength range, such that R1/R2 is greater than or equal to about 2. The first reflective polarizer may transmit at least 40% of light for a first polarization state for each wavelength in the first wavelength range, may reflect at least 70% of light for an orthogonal second polarization state for each wavelength in the first wavelength range, and transmit at least 40% of light for each of the first and second polarization states and for each wavelength in the second wavelength range.

In some aspects of the present description, a backlight is provided, the backlight including a back reflector, an optical stack disposed on the back reflector, and a lightguide disposed between the back reflector and the optical stack. The optical diffuser has a first scattering rate R1 for at least one wavelength in a first wavelength range, and a second scattering rate R2 for at least one wavelength in a second wavelength range, as described herein. For substantially normally incident light and for each of a first and a second polarization states, the back reflector reflects at least 70% of light for each wavelength in the first wavelength range, and transmits at least 70% of light for each wavelength in the second wavelength range.

In some aspects of the present description, an optical stack is provided, the optical stack including an optical diffuser; and an optical film disposed on the optical diffuser and comprising a plurality of alternating polymeric first and second interference layers numbering greater than about 50, each interference layer having an average thickness less than about 250 nm, such that for nonoverlapping first and second wavelength ranges, the first wavelength range extending at least from about 450 nm to about 600 nm, and the second wavelength range extending at least from about 800 nm to about 1200 nm. The optical diffuser may have a first scattering rate R1 for at least one wavelength in the first wavelength range, and may have a second scattering rate R2 for at least one wavelength in the second wavelength range, such that R1/R2 is greater than or equal to 2. For light incident at an incident angle with respect to a direction perpendicular to the optical film, the optical film may have an average optical transmission T0 in the first wavelength range when the incident angle is about zero degree, an average optical transmittance T60 when the incident angle is about 60 degrees, and an average optical transmission T1 in the second wavelength range when the incident angle is about zero degree, such that T60/T0 is less than about 0.8, and T1 is greater than about 40%.

In some aspects of the present description, an optical stack is provided, including an optical diffuser having an average total transmission, T1, and an average diffuse transmission, T2, in a first wavelength range extending from about 450 nm to about 600 nm, such that T2/T1 is greater than about 0.4, a multilayer optical film disposed on the optical diffuser and comprising a plurality of alternating first and second polymeric layers numbering at least 30, each first and second polymeric layer having an average thickness less than about 500 nm, and an optical reflector disposed on the multilayer optical film and reflecting at least 70% of light for each wavelength in the first wavelength range for each of orthogonal first and second polarization states, wherein the optical stack has a modulation transfer function (MTF) greater than about 0.4 at 2.2 line pairs per mm for at least one wavelength in a second wavelength range extending from about 800 nm to about 1200 nm.

DETAILED DESCRIPTION

Figure 1:
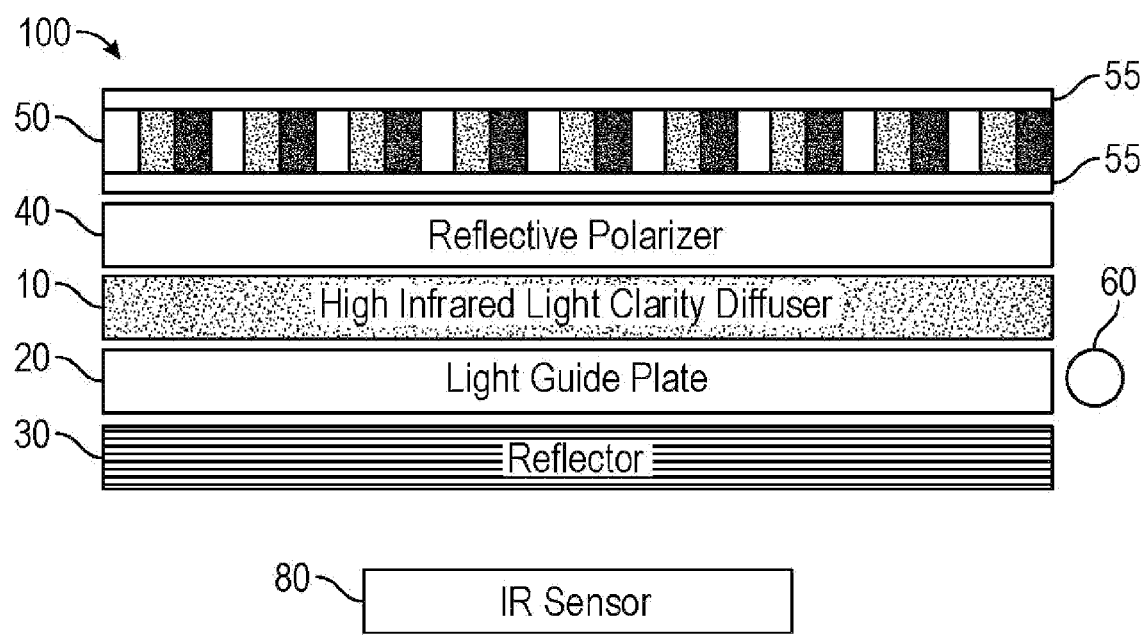
FIG. 1 is a cross-sectional view of an optical stack including a diffuser with high infrared clarity, in accordance with an embodiment described herein.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some aspects of the present description, an optical stack is provided, the optical stack including an optical diffuser and a first reflective polarizer disposed on the optical diffuser. For substantially normally incident light and for nonoverlapping first and second wavelength ranges, the first wavelength range extending at least from about 450 nm to about 600 nm, and the second wavelength range extending at least from about 800 nm to about 1200 nm: the optical diffuser has a first scattering rate R1 for at least one wavelength in the first wavelength range (such as, in some embodiments, about 500 nm), and a second scattering rate R2 for at least one wavelength in the second wavelength range (such as, in some embodiments, about 840 nm, or about 940 nm), such that R1/R2 is greater than or equal to about 2, or greater than about 2.5, or greater than about 3.0, or greater than about 3.5, or greater than about 4.0, or greater than about 4.5, or greater than about 5.0. In some embodiments, the optical diffuser may have a first average scattering rate, R11, in the first wavelength range, and a second average scattering rate, R22, in the second wavelength range, such that the ratio R11/R22 is greater than about 2.0, or greater than about 2.5, or greater than about 3.0, or greater than about 3.5, or greater than about 4.0, or greater than about 4.5, or greater than about 5.0.

In some embodiments, the first wavelength range may extend from about 420 nm to about 650 nm. In some embodiments, the second wavelength range may extend from about 800 nm to about 1550 nm, or from about 800 nm to about 2000 nm.

In some embodiments, a scattering rate may be defined for a specified wavelength or range of wavelengths, and for light entering the diffuser at an angle of incidence normal to the surface of the diffuser, as the ratio of the amount of diffusely transmitted light leaving the diffuser over the total amount of light (including specular transmitted light) leaving the diffuser. That is, the total amount of light, $T_{total}$, exiting the diffuser may be expressed as:

$$T_{total} = T_{diff} + T_{spec}$$

where $T_{spec}$ is the total amount of light from specular transmission (exiting the diffuser with an angle less than about 5 degrees from normal), and $T_{diff}$ is the total amount of light from diffuse transmission (exiting the diffuser with an angle of more than about 5 degrees from normal). The scattering rate, R, may then be defined as:

$$R = T_{diff}/T_{total}$$

In some embodiments, the optical diffuser may include a plurality of particles (e.g., beads) dispersed substantially uniformly in a binder. In some embodiments, precise control of the size of the particles can determine which wavelengths of light are scattered and to what degree they are scattered. In some embodiments, the particle size may be selected such that a relatively low scattering (i.e., diffusion) of light occurs for light in the near infrared range (e.g., from about 800 nm to about 1200 nm). In some embodiments, the optical diffuser may include a binder defining a plurality of interconnected voids therein, such that, for at least one cross-section of the optical diffuser along a thickness direction thereof, the voids cover at least about 20% of the cross-section, the optical diffuser and the binder having respective indices of refraction nd and nb at at least one wavelength in the first wavelength range, such that nd is less than nb. In some embodiments, the value of nb may be greater than about 1.45, or greater than about 1.5, or greater than about 1.55. In some embodiments, the value of nd may be less than about 1.4, or less than about 1.3, or less than about 1.25 or less than about 1.2, or less than about 1.15, or less than about 1.1. In some embodiments, the optical diffuser may include a plurality of particles dispersed in a binder, in a set of interconnected voids, or in both a binder and interconnected voids. In some embodiments, the plurality of interconnected voids may include a plurality of surface voids disposed at at least one major surface of the binder, and a plurality of interior voids disposed at an interior of the binder, such that at least one hollow channel connects at least one interior void to at least one surface void. In some embodiments, the average thickness of the binder is less than about 1.5 microns, or less than about 1.0, or less than about 0.75, or less than about 0.5.

In some embodiments, a diffuser which provides higher amounts of diffusion in a first wavelength range (e.g., wavelengths of human-visible light) and lower amounts of diffusion (or substantially no diffusion) in a second wavelength range (e.g., wavelengths of near infrared light) may be useful for certain applications. Such an optical diffuser with high transmission (high clarity) in one or more infrared light wavelengths may be adapted for use in a backlight of a display, to diffuse human-visible light transmitted from the backlight to a display (such as a liquid crystal display, or LCD), providing a more planar, more uniform light source for the display, while allowing, for example, near infrared wavelengths to be passed substantially unaltered. In some embodiments, this may allow an infrared sensor (such as, for example, a CMOS/TFT camera sensitive to infrared wavelengths) to be placed behind the surface of a display. A typical optical diffuser in the prior art will cause diffusion in both human-visible wavelengths and infrared wavelengths. While diffusion is typically a benefit for providing more uniform illumination to the display (e.g., smoothing defects and non-uniformities from light point sources), light passing into the display from outside, such as light detected by a camera or sensor behind the display, will also be diffused. This means that the camera or sensor cannot detect enough detail to form a clear image. However, by using an optical diffuser with relatively high scattering in visible wavelengths, and relatively low scattering in infrared wavelengths, it is possible to achieve both uniform display illumination and image clarity as seen at the sensor. That is, the visible light from the backlight will be diffused, while infrared light is allowed to pass through the diffuser to the sensor with little or no diffusion.

In some embodiments, the optical stack may receive light from one or more light sources, such that the one or more light sources emit light in each of the first and second wavelength ranges (e.g., in both the human-visible and infrared ranges). For example, in some embodiments, the optical stack may receive light emitted by a light source (e.g., a light emitting diode, or a laser) and directed through a light guide plate through internal reflection.

The first reflective polarizer may transmit at least 40%, or at least 50%, or at least 60%, or at least 70%, or at least 80% of light for a first polarization state for each wavelength in the first wavelength range. The first reflective polarizer may reflect at least 70%, or at least 80%, or at least 90% of light for an orthogonal second polarization state for each wavelength in the first wavelength range. The first reflective polarizer may transmit at least 40%, or at least 50%, of light for each of the first and second polarization states and for each wavelength in the second wavelength range. In some embodiments, the reflective polarizer may be combined with one or more light redirecting films (such as a brightness enhancing film, or BEF), a collimating multilayer optical film (CMOF), or combinations thereof. In some embodiments, the reflective polarizer may itself be a polarizing CMOF (i.e., a CMOF which acts as a reflective polarizer).

For example, in some embodiments, the optical stack may include a first light redirecting film disposed between the first reflective polarizer and the optical diffuser, and a second light redirecting film disposed between the first reflective polarizer and the optical diffuser. The first light redirecting film may include a plurality of substantially parallel first microstructures extending along a first direction, and the second light redirecting film may include a plurality of substantially parallel second microstructures extending along a second direction different from the first direction. In some embodiments, and for substantially normally incident light, each of the first and second light redirecting films may absorb less than about 10% of the incident light for each of the first and second wavelength ranges.

In some embodiments, the reflective polarizer may include a plurality of alternating first and second polymeric layers numbering between 50 and 1000, each first and second polymeric layer having an average thickness less than about 500 nm, wherein each first polymeric layer is substantially uniaxially oriented, and each second polymeric layer is substantially biaxially oriented. In some embodiments, in a plane of the first polymeric layer, the first polymeric layer may have indices of refraction $n1x$, $n1y$, and $n1z$ along the first polarization state, the second polarization state, and a z-axis orthogonal to the first and second polarization states, respectively, such that for at least one wavelength in the first wavelength range, a maximum difference between $n1x$ and $n1z$ is less than about 0.02, and an absolute value between $n1x$ and $n1y$ is greater than about 0.05.

In some embodiments, when the reflective polarizer is a CMOF, for the first wavelength range and for light incident at an incident angle with respect to a direction perpendicular to the first reflective polarizer, the first reflective polarizer has an average optical transmission T0 when the incident angle is about zero degrees, and an average optical transmittance T60 when the incident angle is about 60 degrees, such that the ratio T60/T0 is less than about 0.8, or about 0.75, or about 0.7, or about 0.65, or about 0.6, or about 0.55, or about 0.5.

In some embodiments, the optical stack may have a first average optical haze, H1, in the first wavelength range, and a second average optical haze, H2, in the second wavelength range, such that the ratio H1/H2 is greater than about 1.5, or greater than about 2.0, or greater than about 2.5, or greater than about 3.0, or greater than about 3.5, or greater than about 4.0, or greater than about 4.5, or greater than about 5.0. As used herein, optical haze refers to transmission haze, where light passing through a material (such as a diffuser or optical stack) interacts with and/or is affected by irregularities in the material (e.g., suspended particles, contaminants, voids, and/or air spaces). Light is dispersed at an angle which is determined by the refractive index of the material (including irregularities) and the angle of illumination, producing the optical haze.

According to some aspects of the present description, a backlight is provided, the backlight including a back reflector, an optical stack disposed on the back reflector, and a lightguide disposed between the back reflector and the optical stack. The optical diffuser has a first scattering rate R1 for at least one wavelength in a first wavelength range (e.g., human-visible light), and a second scattering rate R2 for at least one wavelength in a second wavelength range (e.g., near infrared light), as described elsewhere herein. For substantially normally incident light and for each of a first and a second polarization states, the back reflector reflects at least 70% of light for each wavelength in the first wavelength range, and transmits at least 70% of light for each wavelength in the second wavelength range. In some embodiments, a display may be created, including the backlight, such that the backlight is disposed between a liquid crystal panel or module and an infrared-sensitive detector. In some embodiments, when an infrared emitting source emitting light in the second wavelength range is disposed proximate the liquid crystal panel, the infrared-sensitive detector detects at least some of the light emitted by the infrared emitting source in the second wavelength range. In some embodiments, the display may be configured to form a first image in the first wavelength range for viewing by a viewer, and a second image in the second wavelength range detectable by an infrared-sensitive camera.

According to some aspects of the present description, an optical stack is provided, the optical stack including an optical diffuser; and an optical film disposed on the optical diffuser and comprising a plurality of alternating polymeric first and second interference layers numbering greater than about 50, each interference layer having an average thickness less than about 250 nm, such that for nonoverlapping first and second wavelength ranges, the first wavelength range extending at least from about 450 nm to about 600 nm in some embodiments, and the second wavelength range extending at least from about 800 nm to about 1200 nm in some embodiments. The optical diffuser may have a first scattering rate R1 for at least one wavelength in the first wavelength range, and may have a second scattering rate R2 for at least one wavelength in the second wavelength range, such that R1/R2 is greater than or equal to 2. For light incident at an incident angle with respect to a direction perpendicular to the optical film, the optical film may have an average optical transmission T0 in the first wavelength range when the incident angle is about zero degrees, an average optical transmittance T60 when the incident angle is about 60 degrees, and an average optical transmission T1 in the second wavelength range when the incident angle is about zero degrees, such that T60/T0 is less than about 0.8, and T1 is greater than about 40%.

According to some aspects of the present description, an optical stack is provided, including an optical diffuser, a multilayer optical film disposed on the optical diffuser, and an optical reflector disposed on the multilayer optical film. In some embodiments, the optical diffuser may have an average total transmission, T1, and an average diffuse transmission, T2, in a first wavelength range extending from about 450 nm to about 600 nm, such that the ratio T2/T1 is greater than about 0.4, or greater than about 0.5, or greater than about 0.6. In some embodiments, the optical diffuser may have an average total transmission, T1', and an average diffuse transmission, T2', in a second wavelength range, such that the ratio T2'/T1' is less than about 0.3, or less than about 0.2. In some embodiments, the second wavelength range may extend from about 800 nm to about 1200 nm. In some embodiments, the optical reflector may transmit at least 70% of light for each wavelength in the second wavelength range for each of the first and second polarization states.

In some embodiments, the optical reflector may reflect at least 70% of light for each wavelength in the first wavelength range for each of orthogonal first and second polarization states, wherein the optical stack has a modulation transfer function (MTF) greater than about 0.4 at 2.2 line pairs per mm for at least one wavelength (e.g., about 940 nm) in a second wavelength range extending from about 800 nm to about 1200 nm. In some embodiments, the optical reflector includes a plurality of alternating lower index and higher index polymeric layers numbering at least 30, each lower index and higher index polymeric layer having an average thickness less than about 500 nm.

In some embodiments, the multilayer optical film may include a plurality of alternating first and second polymeric layers numbering at least 30, each first and second polymeric layer having an average thickness less than about 500 nm. In some embodiments, the multilayer optical film may be a reflective polarizer transmitting at least 40% of light for the first polarization state for each wavelength in the first wavelength range, and reflecting at least 70% of light for the second polarization state for each wavelength in the first wavelength range. In some embodiments, the reflective polarizer transmits at least 40% of light for each of the first and second polarization states and for each wavelength in the second wavelength range.

In some embodiments, for the first wavelength range and for light incident at an incident angle with respect to a direction perpendicular to the multilayer optical film, the multilayer optical film may have an average optical transmission T0 when the incident angle is about zero degrees, and an average optical transmittance T60 when the incident angle is about 60 degrees, such that the ratio T60/T0 is less than about 0.8, or less than about 0.75, or less than about 0.7, or less than about 0.65. or less than about 0.6, or less than about 0.55, or less than about 0.5.

In some embodiments, the optical stack may have a modulation transfer function (MTF) greater than about 0.5 at 2.2 line pairs per mm for the at least one wavelength in the second wavelength range. In some embodiments, the optical stack may have an MTF greater than about 0.3 at 3.1 line pairs per mm for the at least one wavelength in the second wavelength range. In some embodiments, the optical stack may have an MTF greater than about 0.2 at 3.9 line pairs per mm for the at least one wavelength in the second wavelength range.

Turning now to the figures, FIG. 1 is a cross-sectional view of an embodiment of an optical stack including a diffuser with high infrared clarity. In some embodiments, optical stack 100 comprises an optical diffuser 10 and a reflective polarizer 40 disposed on the optical diffuser 10. As described elsewhere herein, optical diffuser 10 may have a first scattering rate, R1, for light in a first wavelength range (e.g., human-visible light) and a second scattering rate, R2, for light in a second wavelength range (e.g., near infrared light), such that R1 is greater than R2. That is, in some embodiments, optical diffuser 10 will scatter light in the first wavelength range more than light in the second wavelength range. The optical stack 100 may also include a light guide plate 20. In some embodiments, light guide plate 20 may receive input light from one or more light sources 60. In some embodiments, light source 60 may be disposed on an edge of light guide plate 20, such that light from light source 60 enters light guide plate 20 and is directed via internal reflection such that it leaves light guide plate 20 and enters optical diffuser 10. In some embodiments, optical stack 100 may also include a reflector 30, disposed on a side of light guide plate 20 opposite optical diffuser 10, such that light in the first wavelength range escaping light guide 20 toward reflector 30 will be reflected back into light guide 20 for another chance of being directed into diffuser 10.

In some embodiments, reflector 30 may substantially reflect light in the first wavelength range, and may substantially transmit light in the second wavelength range. In some embodiments, the light emitted by light source 60 may contain wavelengths of light in both the first wavelength range and the second wavelength range. In some embodiments, light emitted by light source 60 may contain light of both a first polarization state and a second polarization state (e.g., s-polarized light and p-polarized light). In other words, light emitted by light source 60 may be initially unpolarized (i.e., contain light of multiple polarization states simultaneously).

In some embodiments, light passes through optical diffuser 10 and enters reflective polarizer 40. In some embodiments, reflective polarizer 40 may substantially transmit light of a first polarization state and substantially reflect light of a second polarization state. In some embodiments, light leaving optical diffuser 10 may be unpolarized. As the light enters reflective polarizer 40, light of the second polarization state may substantially be reflected back into diffuser 10, and light of the first polarization state may substantially be transmitted. Light transmitted through reflective polarizer 40 (i.e., substantially light of the first polarization state) may then pass into display 50, which may selectively transmit or block the light to create an image on the display. In some embodiments, display 50 may be a liquid crystal display, although any appropriate type of display or light modulation device may be used. In some embodiments, display 50 is designed to transmit or block light of a single polarization state, but may not work with light of a different polarization state. Therefore, in order to prevent unwanted light of the second polarization state which has leaked through reflective polarizer 40 (as reflective polarizer 40 may not be 100% efficient) from passing through display 50, one or more absorbing polarizers 55 may be disposed on one or more sides of display 50. The intent of absorbing polarizers 55 is to substantially absorb light of the second polarization state which may have leaked through reflective polarizer 40 and/or display 50. In some embodiments, each of the reflective polarizer 40, absorbing polarizers 55, light guide plate 20, and reflector 30 may substantially allow the transmission of infrared (IR) light.

It should be noted that references to a first polarization state and a second polarization state are not intended to be limiting. In one embodiments, the first polarization state may be s-polarized light and the second polarization state may be p-polarized light, but in other embodiments, these states can be swapped. In some embodiments, the first polarization state may be linear-polarized light and the second polarization state may be circularly-polarized light, or vice versa. In some embodiments, the first polarization state may be circularly-polarized light of one direction (e.g., right-circularly polarized), and the second polarization state may be circular-polarized light of the opposite direction (e.g., left-circularly polarized). Any appropriate types of polarizing may be used for the first and second polarization states, as long as the two types are different from each other.

In some embodiments, optical stack 100 may include an infrared sensor 80 (e.g., an infrared-sensitive device, such as an IR camera.) IR sensor 80 can detect IR light that has passed through the various layers of the optical stack. An IR sensor 80 placed beneath the optical stack 100 may remain essentially hidden from view from an observer looking at display 50, but can receive and process infrared light from something in front of (external to) display 50. For example, the IR sensor 80 may be able to receive infrared light reflected from a fingerprint pressed to, or held near, the surface of display 50, allowing a fingerprint sensor to be placed beneath the display in some devices (e.g., a smart phone).

Figure 2:
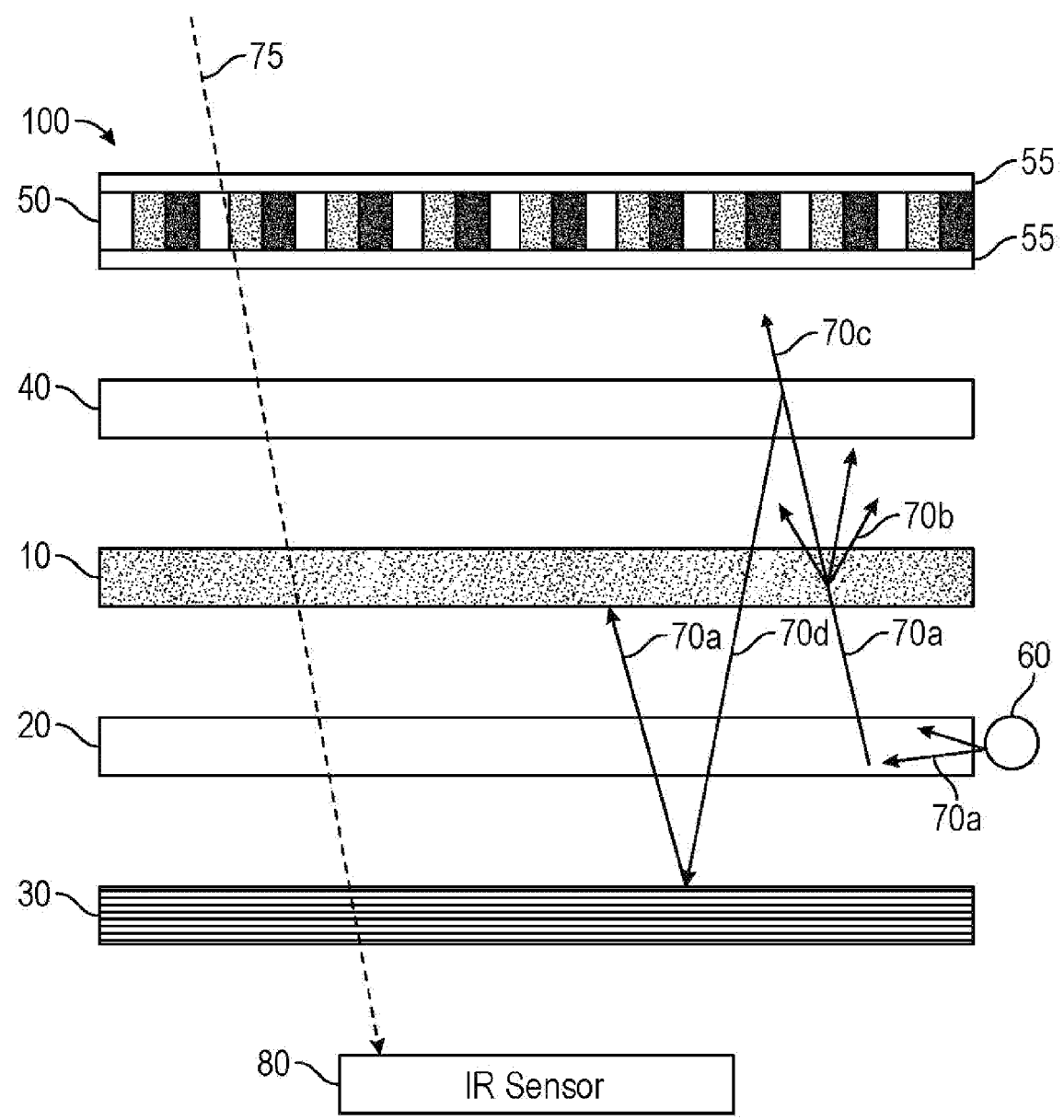
FIG. 2 is an exploded cross-sectional view of an optical stack including a diffuser with high infrared clarity, in accordance with an embodiment described herein.

FIG. 2 is an exploded, cross-sectional view of the optical stack 100 of FIG. 1, showing how light of various wavelengths and polarizations may interact with the layers of the stack in some embodiments. Components in FIG. 2 which are shared with FIG. 1 will have like-numbered reference designators, and shall function the same as previously described. Light source 60 emits unpolarized light 70*a*, which may, in some embodiments, include both human-visible and infrared wavelengths of light. For the purposes of clarity, only the human-visible portions of light 70*a* are shown, using arrow with solid lines, and any infrared portions of the emitted light are not shown.

Unpolarized light 70*a* enters light guide plate 20, where it is passed via internal reflection through the length of light guide plate 20, before exiting light guide plate 20. Any of the unpolarized light 70*a* that leaves through the bottom side of light guide plate 20 (the side adjacent reflector 30) will fall on reflector 30. Portions of light 70*a* which are in the human-visible range of wavelengths will be substantially reflected by reflector 30, while portions of light 70*a* that are in the near infrared range (not shown) will be substantially transmitted through reflector 30. Most of unpolarized light 70*a*, however, will be transmitted through the top side of light guide plate 20 (i.e., the side adjacent to optical diffuser 10) and will pass into optical diffuser 10. Optical diffuser 10 will cause the light to be diffused, creating diffuse light 70*b*. Diffuse light 70*b* then passes into reflective polarizer 40, and the portion of light 70*b* that is of a first polarization state is substantially transmitted through reflective polarizer 40 to become transmitted polarized light 70*c*, and the portion of light 70*b* that is of the second polarization state is substantially reflected back as reflected polarized light 70*d*. Note that transmitted polarized light 70*c* and reflected polarized light 70*d* are of different (e.g., opposite) polarization states. Transmitted polarized light 70*c* is allowed to pass into display 50 (and, in some embodiments, absorbing polarizers 55) to create an image on display 50. Reflected polarized light 70*d* passes through light guide plate 20, strikes reflector 30, and is reflected back, to be recycled into the optical stack. In some instances, portions of the reflected light may change polarization states as a result of reflection, and may again become unpolarized light 70*a*.

In some embodiments, light in the second wavelength range (i.e., infrared light) 75, shown in FIG. 2 with a dashed arrow, may be substantially transmitted through each layer of the optical stack 100, without being diffused by diffuser 10 or reflected by any of the layers. Infrared light 75 therefore is allowed to reach IR sensor 80, where it may be detected and processed.

Figure 3A:
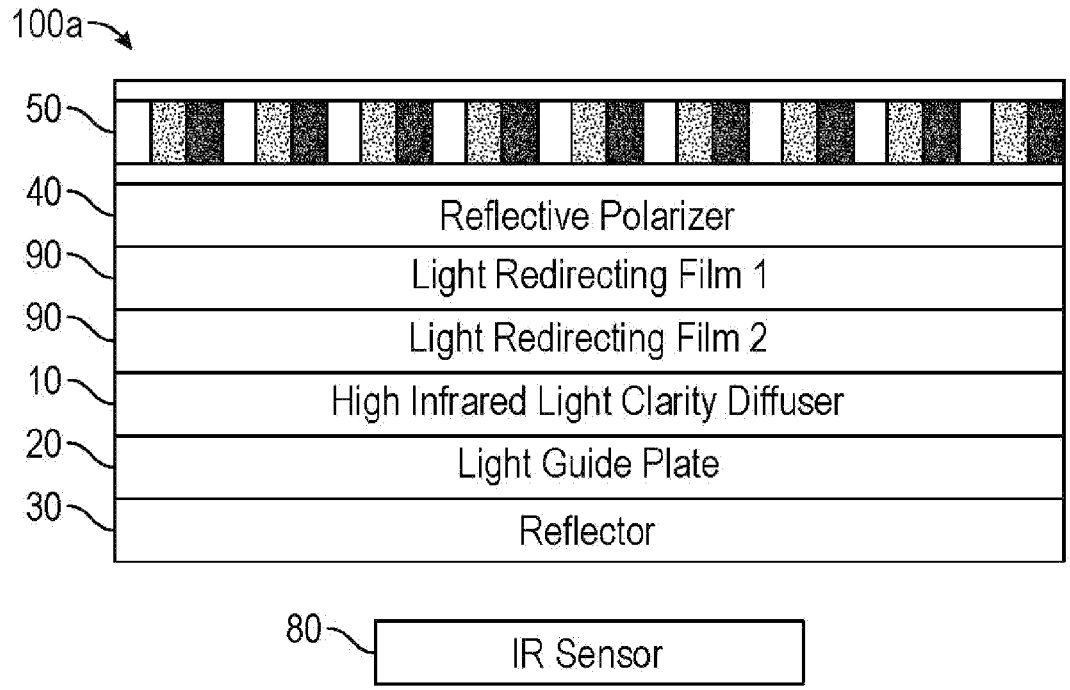
FIGS. 3A and 3B provide cross-sectional views of optical stacks including a diffuser with high infrared clarity, in accordance with embodiments described herein.
Figure 3B:
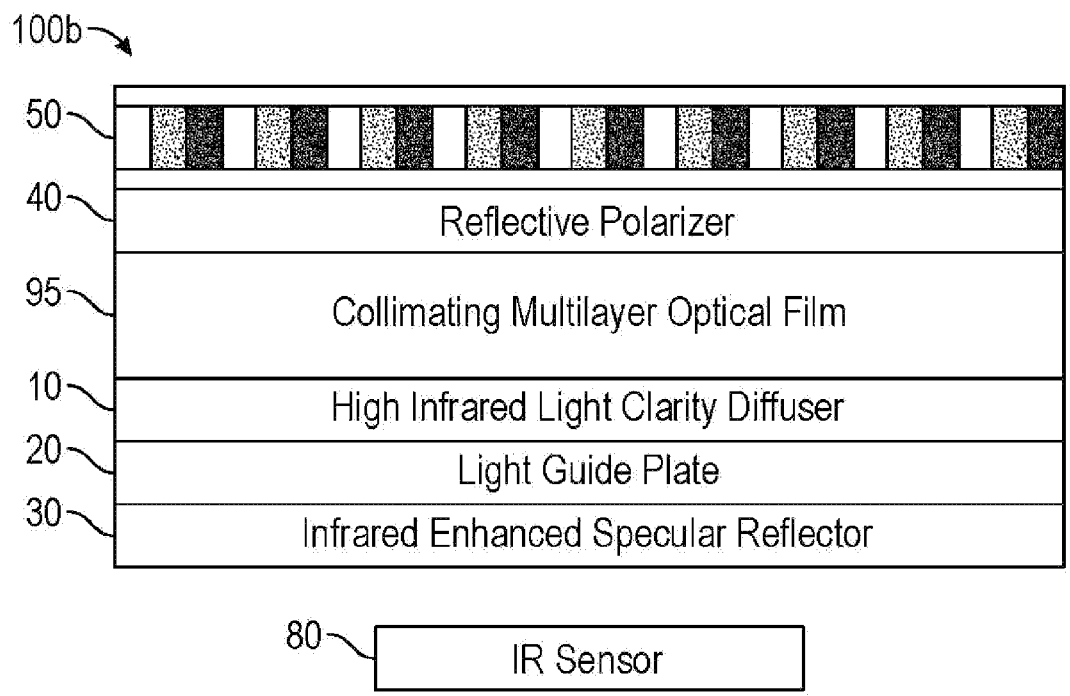

FIGS. 3A and 3B provide cross-sectional views of alternate embodiments of optical stacks including a diffuser with high infrared clarity. Components in FIGS. 3A and 3B which are common to previously discussed figures will have like-numbered reference designators, and shall function the same as previously described. In FIG. 3A, an alternate embodiment 100*a* of the optical stack is provided. In optical stack 100*a*, two additional layers have been added, disposed between the optical diffuser 10 and reflective polarizer 40. These layers include a first and second light redirecting film 90. In some embodiments, each light redirecting film 90 includes a plurality of substantially parallel microstructures (e.g., parallel transparent prisms). The microstructures of the first light redirecting film 90 may extend along a first direction, and the microstructures of the second light redirecting film 90 may extend along a second direction which is different from the first direction (e.g., orthogonal to). In some embodiments, these crossed light redirecting films 90 tend to focus and redirect light passing through them such that the light output from the pair of films 90 is substantially collimated and on-axis. In some embodiments, only a single light redirecting film 90 may be used.

In FIG. 3B, optical stack 100*b* replaces the dual light redirecting films 90 of FIG. 3A with a single collimating multilayer optical film (CMOF). In some embodiments, a CMOF is a single film which can provide multiple functions, including behaving as an optical diffuser, light redirection (prism) film, and/or a reflective polarizer. In some embodiments, a single CMOF film may replace other layers in optical stack 100*b*, including the reflective polarizer 40 and optical diffuser 10. In some embodiments, the reflector 30 at the bottom of the optical stack 100*b* may also be replaced with an infrared-transmitting enhanced specular reflector (ESR). An ESR is a non-metallic mirror film which may be designed to substantially reflect human-visible light and substantially transmit light in the near infrared wavelengths.

Figure 4:
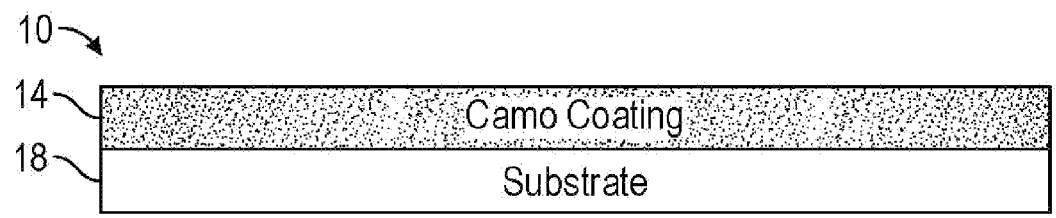
FIG. 4 is a cross-sectional view of an optical diffuser with high infrared clarity, in accordance with an embodiment described herein.

FIG. 4 is a cross-sectional view of one embodiment of an optical diffuser 10 with high infrared clarity, in accordance with an embodiment described herein. In some embodiments, optical diffuser 10 may be constructed with two layers, a substrate layer 18 and a coating layer 14. The substrate layer 18 may be any appropriate polymeric substrate, such as, for example, polyethylene terephthalate (PET). The coating layer 14 is a layer placed over the substrate layer 18, and contains particles which can alter the path of light traveling through the layer. The size of the particles can be chosen such that only certain wavelengths of light are scattered (i.e., diffused), while other wavelengths are substantially allowed to pass through the layer.

Figure 5:
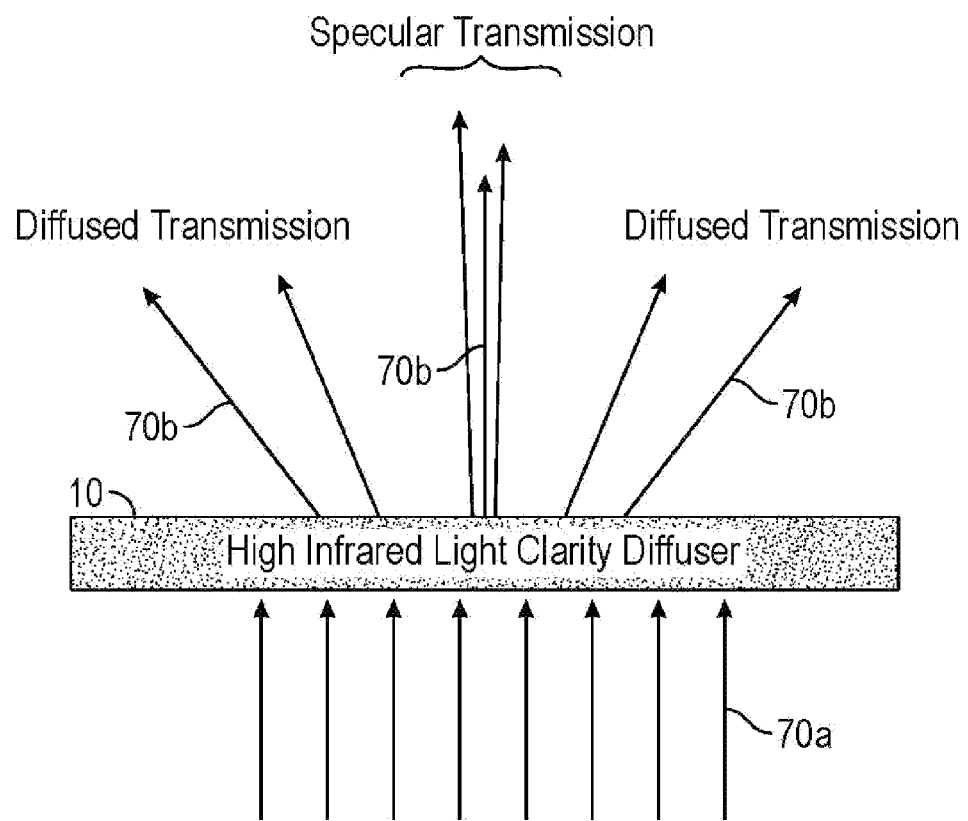
FIG. 5 illustrates how visible light may be diffused by an optical diffuser with high infrared clarity, in accordance with an embodiment described herein.

FIG. 5 illustrates how visible light may be diffused by an optical diffuser with high infrared clarity, in accordance with an embodiment described herein. FIG. 5 shows how some of the light 70*a* entering the diffuser at an angle of incidence substantially normal to the diffuser 10 passes through the diffuser 10 as diffuse light 70*b*. A portion of diffuse light 70*b* will include specular transmissions (i.e., light that passes exits the diffuser substantially perpendicular to the surface of the diffuser) and diffused transmissions (i.e., light that exists the diffuser at an angle from the perpendicular, such as, for example, an angle of 5 degrees or greater from normal). As previously described herein, the total amount of light contained in specular transmissions and the total amount of light contained in diffused transmissions for a given wavelength can be used to determine the scattering rate of the diffuser for that wavelength. In some embodiments, the scattering rate calculated at one wavelength of light may be significantly different from the scattering rate for a different wavelength of light. In some embodiments in the present description, the diffuser may have a first scattering rate, R1, for human-visible light which is significantly higher than a second scattering rate, R2, for infrared light.

Figure 6:
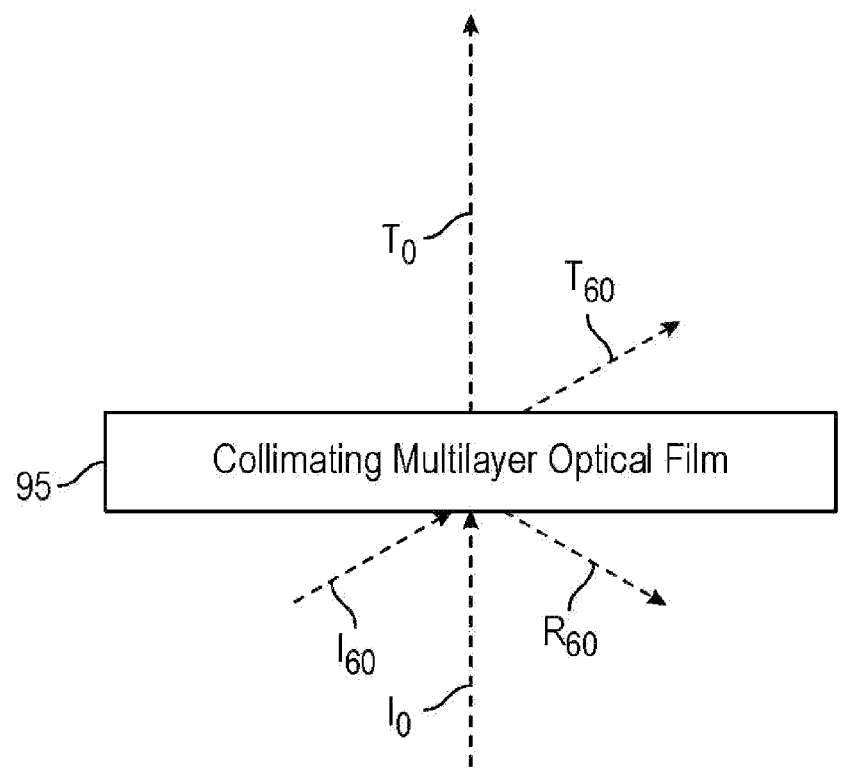
FIG. 6 illustrates the operation of a collimating multilayer optical film, in accordance with an embodiment described herein.

FIG. 6 illustrates the operation of a collimating multilayer optical film, or CMOF, in accordance with an embodiment described herein. The purpose of a CMOF is to receive light at various angles on one surface, and to redirect at least a portion of that light such that an increased amount of the light passing through the CMOF will exit the other side of the CMOF at an angle that is substantially perpendicular to the surface of the CMOF. In FIG. 6, light is shown hitting the CMOF's bottom surface at two separate incidence angles, 0 degrees (i.e., perpendicular to the surface of the CMOF) and 60 degrees (i.e., 60 degrees off of the perpendicular). In reality, light would enter the CMOF at several different angles, but these two angles are shown for illustration and discussion purposes. Also, it should be assumed for the purposes of discussion that the light rays shown represent light in the first wavelength range (e.g., human-visible light).

Light with an incident angle of 0 degrees (i.e., directly striking the surface of the CMOF) is shown as $I_0$. Light with an incident angle of 60 degrees is shown as $I_{60}$. Some portion of the $I_{60}$ light will reflect off of the CMOF as $R_{60}$, while some portion of $I_{60}$ will pass into the CMOF. Substantially all of the $I_0$ light will pass into the CMOF. Again, the purpose of the CMOF is to increase the overall percentage of light that is transmitted through the CMOF and leaves the CMOF with an incidence angle of 0 degrees. In other words, the purpose of the CMOF is to increase the collimation of the exiting light over that of the light entering the CMOF. The light exiting the CMOF is show as T0 (light exiting with an incident angle of about zero degrees) and T60 (light exiting with an incident angle of about 60 degrees). As before, some light may exit the CMOF at any number of exit angles, but 0 and 60 degrees are shown for discussion purposes. Some portion of all light entering the CMOF at all angles of incidence may be collimated by the CMOF, increasing the amount of light in T0, and reducing the amount of light that is transmitted as T60. In other words, T0 should be greater than T60, no matter the relative sizes of 10 and 160, such that the ratio T60/T0 may be less than about 0.8, or less than about 0.75, or less than about 0.7, or less than about 0.65, or less than about 0.6, or less than about 0.55, or less than about 0.5.

Figure 7:
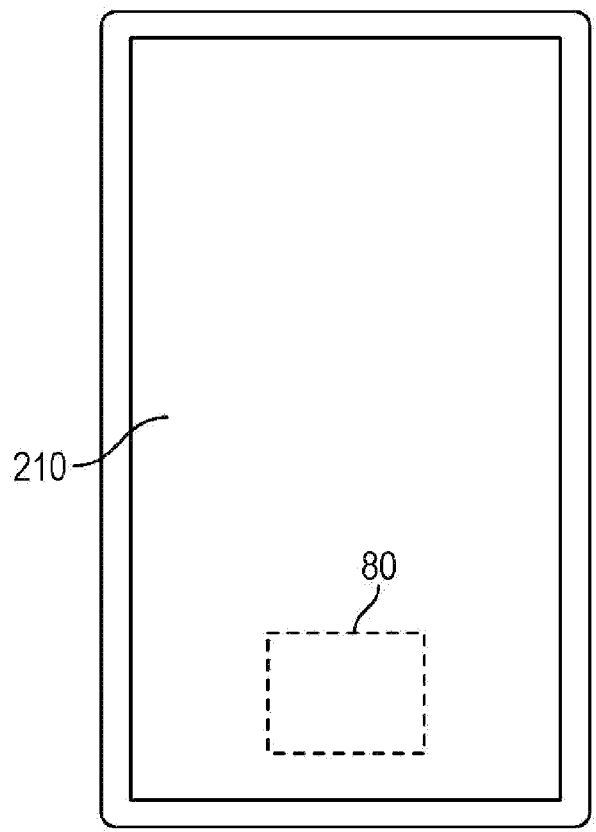
FIG. 7 is a front view of a display with a sensing device disposed behind the display surface, in accordance with an embodiment described herein.

The optical stack 100 of FIG. 1, or its alternate embodiments, can be useful in a number of end applications. For instance, as discussed elsewhere herein, using an optical diffuser with a scattering rate for infrared light that is significantly lower than the scattering rate for human-visible light allows one to embed an IR sensor beneath the surface of a display, allowing the size of the display (the fraction of the bezel covered by the display) to be increased. FIG. 7 is a front view of one embodiment of a display with a sensing device disposed behind the display surface. In this case, IR sensor 80 (shown as a dashed line) can be placed beneath the display 210 and optical backlight stack (not shown) of a user device 200 (e.g., a smart phone). This allows sensor 80 to be completely hidden from the user's view, allows the display 210 to be extended closer to the edges of the bezel, and provides the option to remove other user interface devices from the device 200 (e.g., such as a visible fingerprint sensor or control button). Display 210 may be the optical stack 100 of FIG. 1, or any similar optical stack as discussed herein.

Figure 8:
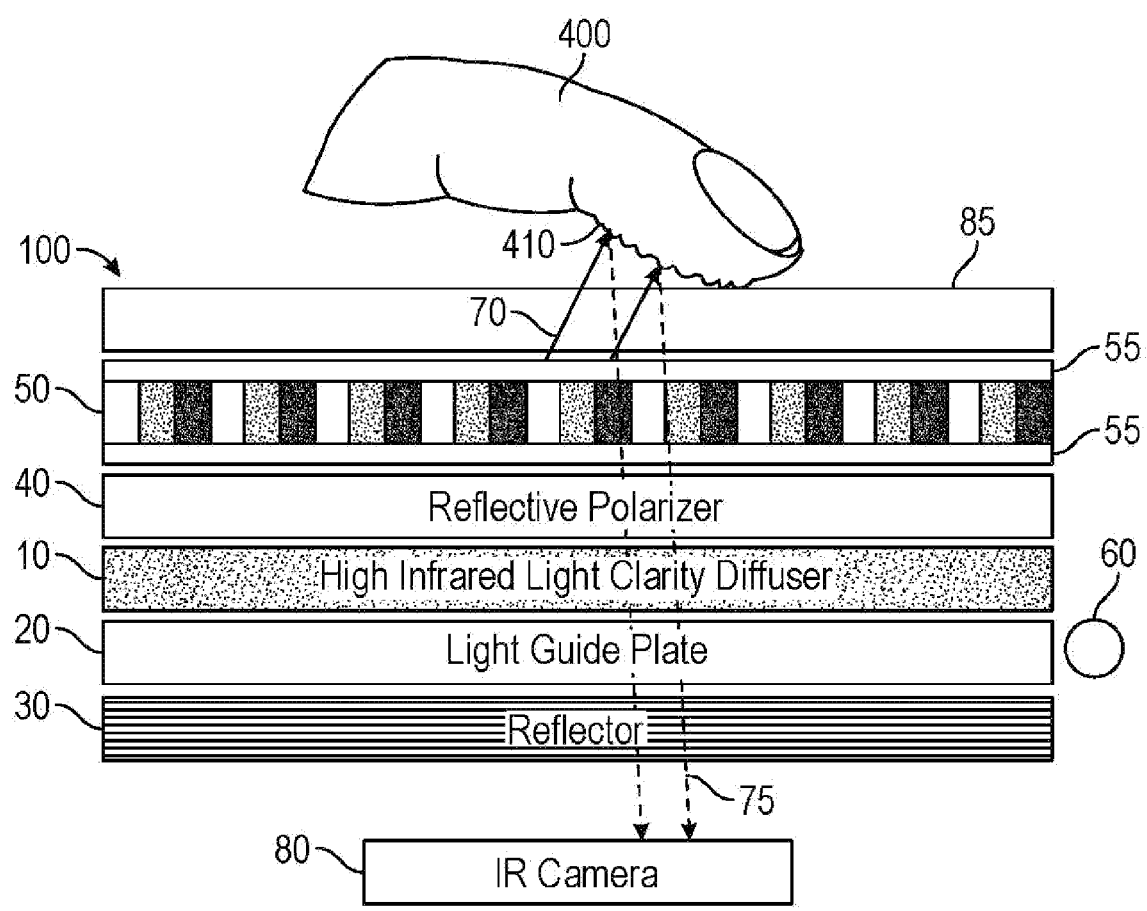
FIG. 8 illustrates an example of how a fingerprint may be scanned by a sensing device disposed behind a display, in accordance with an embodiment described herein.

For example, FIG. 8 illustrates how a fingerprint may be scanned by a sensing device disposed behind a display. The optical stack 100 from FIG. 1 is shown, underneath the front glass 85 of a smart phone or similar application. The IR sensor 80 in this example may be an infrared-sensitive CMOS/TFT camera, or any other appropriate IR sensing device. A user 400 (represented here as a finger) presses their fingerprint 410 against glass 85. Light 70 exiting the optical stack 100, as well as any ambient light around the fingerprint 410, hits the fingerprint 410 and is reflected. Any infrared components 75 of the light reflecting off the ridges of fingerprint 410 are able to pass through optical stack 100 to strike IR sensor 80. Because the optical diffuser 10 is designed to have a low scattering rate (i.e., low diffusion) for infrared light, the infrared light 75 passes through the optical stack 100 with little effect, allowing an image of high clarity to be seen (i.e., detected) by IR sensor 80.

In some embodiments, light source 60 may emit light in both the first wavelength range and the second wavelength range (e.g., human-visible and infrared), such that the infrared light leaving the display as part of exiting light 70 may be used to illuminate the fingerprint 410 using infrared wavelengths. It should be noted that human-visible wavelengths may also be reflected from fingerprint 410, but, as they will be diffused and/or partially absorbed by the layers of optical stack 100, they will not be as useful to the IR sensor 80 as the infrared components, and thus they are not shown in FIG. 8.

Examples

Several example film stacks were made in accordance with embodiments of the description. These films and the resulting transmission spectra and layer thickness profiles are described in the following sections and FIGS. 9A through 15. The coordinate system reference used for all film testing and results is provided in FIG. 15.

Example Film 1. A multilayer optical film was manufactured with two sequential (stacked) packets of microlayers, with 325 individual microlayers layers in each packet. The microlayers in each packet were arranged as alternating layers of material A and material B. Material A was a birefringent polyester PEN (polyethylene naphthalate), and material B was an amorphous polyester PETg GN071. The two microlayer packets were each designed to have a reflection band at two separate, slightly overlapping regions of visible and near-IR wavelengths.

The process conditions chosen for the manufacture of this film, resulted in wavelength-dependent refractive index values, as are shown in Table 1:

TABLE 1

| | Wavelength | | |
|---|---|---|---|
| | 450 | 550 | 633 |
| PEN | | | |
| Nx | 1.897 | 1.826 | 1.798 |
| Ny | 1.682 | 1.639 | 1.623 |
| Nz | 1.560 | 1.532 | 1.523 |
| PETg | | | |
| Niso | 1.593 | 1.572 | 1.563 |

In addition, the extrusion settings for the manufacture of this film were set to provide a phase thickness ratio of a PEN microlayer, relative to the sum of the phase thickness of the same PEN microlayer plus its PETg microlayer pair, of 64%, when calculated using the refractive index set from Table 1 for the x-axis (transverse to machine axis) at 633 nm.

Figure 9A:
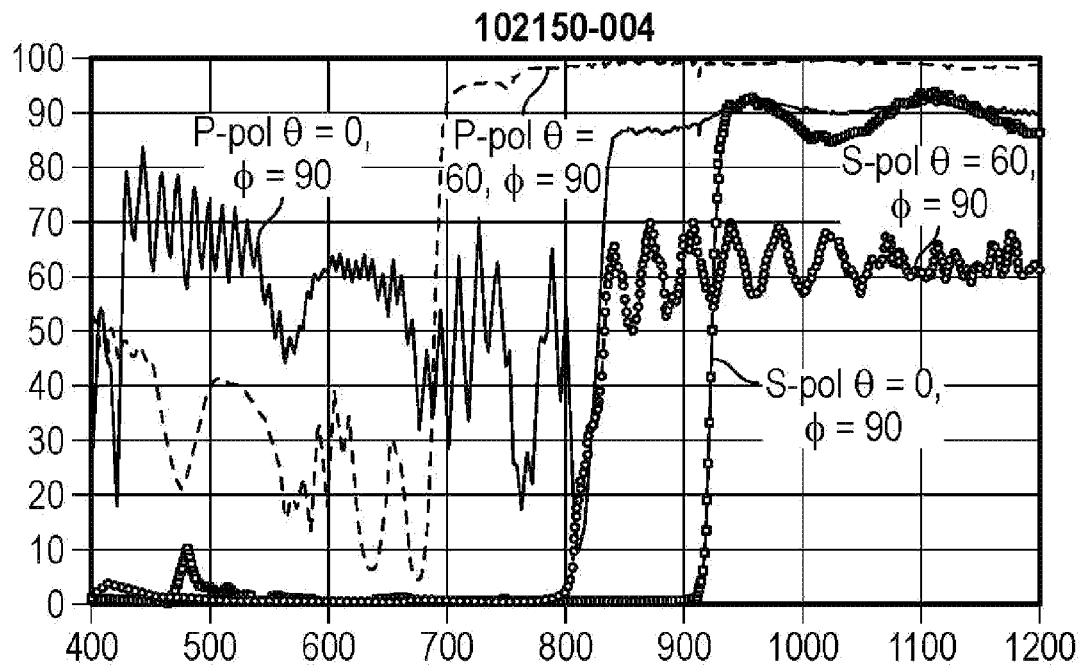
FIGS. 9A and 9B shows the measured transmission spectra and layer thickness profile, respectively, for a first example multilayer optical film, in accordance with an embodiment described herein.
Figure 9B:
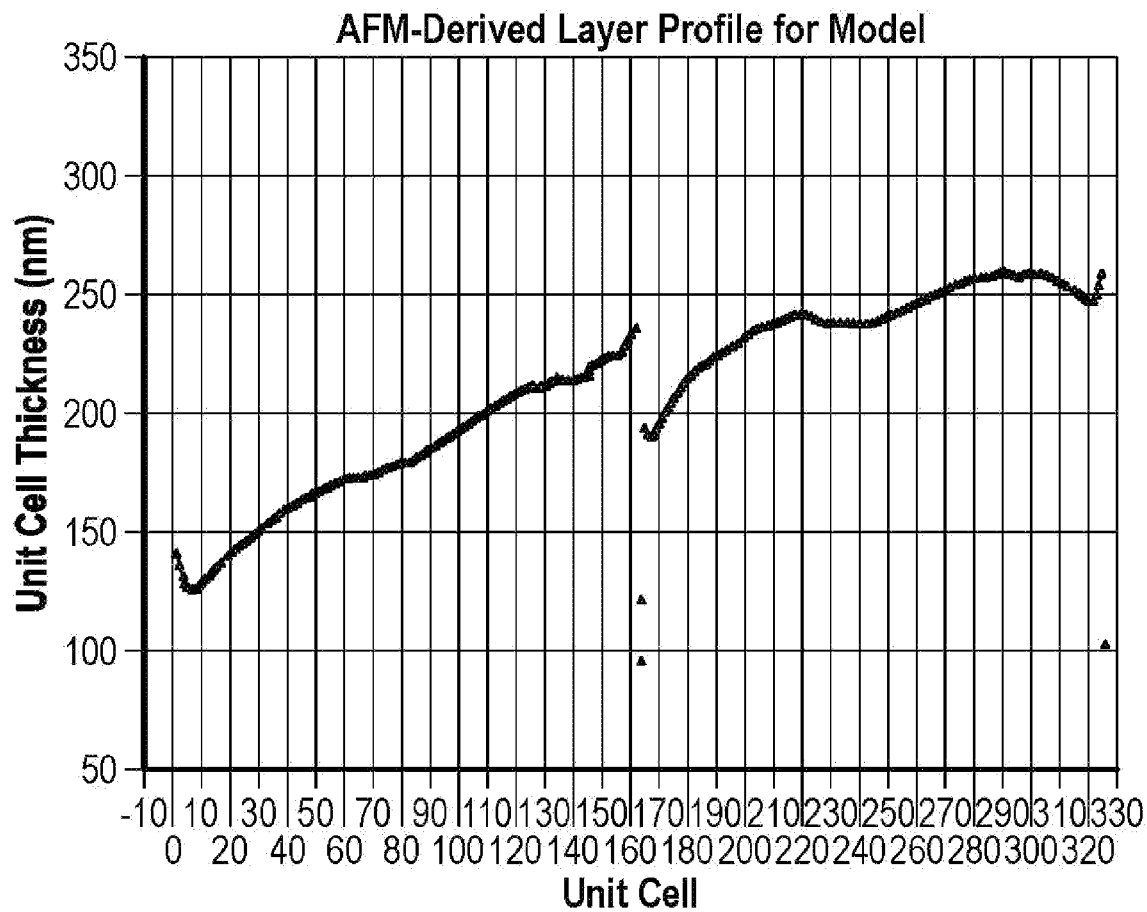

Representative measure spectra for Example Film 1 were measured and are shown in FIG. 9A. A coordinate system reference diagram is presented in FIG. 15. The layer thickness profile for the microlayer pairs (Σ Thickness-A, Thickness-B), in each of the two packets is shown in FIG. 9B.

Example Film 2. A multilayer optical film was manufactured with two sequential (stacked) packets of microlayers, with 275 individual microlayers layers in each packet. The microlayers in each packet were arranged as alternating layers of material A and material B, for Packet 1, and alternating layers of material A and material C for Packet 2. For packet 1, material A is a birefringent polyester Low Melt Point PEN (90% polyethylene naphthalate, 10% polyethylene terephthalate), and material B is an amorphous CoPEN (55% polyethylene naphthalate, 45% polyethylene terephthalate, with a hexane diol crystalline inhibitor). For packet 2, material A is a birefringent polyester Low Melt Point PEN (90% polyethylene naphthalate, 10% polyethylene terephthalate), and material C is an amorphous cyclo-aliphatic copolyester Neostar FN007, supplied by Eastman Chemical Co. The two microlayer packets are each designed to have a reflection band at two, separate, slightly overlapping regions of visible and near-IR wavelengths.

The process conditions chosen for the manufacture of this film, resulted in wavelength-dependent refractive index values, as are shown in Table 2:

TABLE 2

| | Wavelength nm | | |
|---|---|---|---|
| | 450 | 550 | 633 |
| LmPEN HS 450F | | | |
| $N_x$ | 1.867 | 1.798 | 1.770 |
| $N_y$ | 1.690 | 1.647 | 1.631 |
| $N_z$ | 1.545 | 1.517 | 1.508 |
| 55:45 CoPEN | | | |
| $N_{iso}$ | 1.673 | 1.631 | 1.615 |
| FN007 | | | |
| $N_{iso}$ | 1.506 | 1.497 | 1.494 |

In addition, the extrusion settings for the manufacture of this film were set to provide a phase thickness ratio of a LmPEN microlayer, relative to the sum of the phase thickness of the same LmPEN microlayer plus its amorphous microlayer pair, of 50%, when calculated using the refractive index set from Table 2 for the x-axis (transverse to machine axis) at 633 nm. This is true for materials in both packet 1 and packet 2.

Figure 10A:
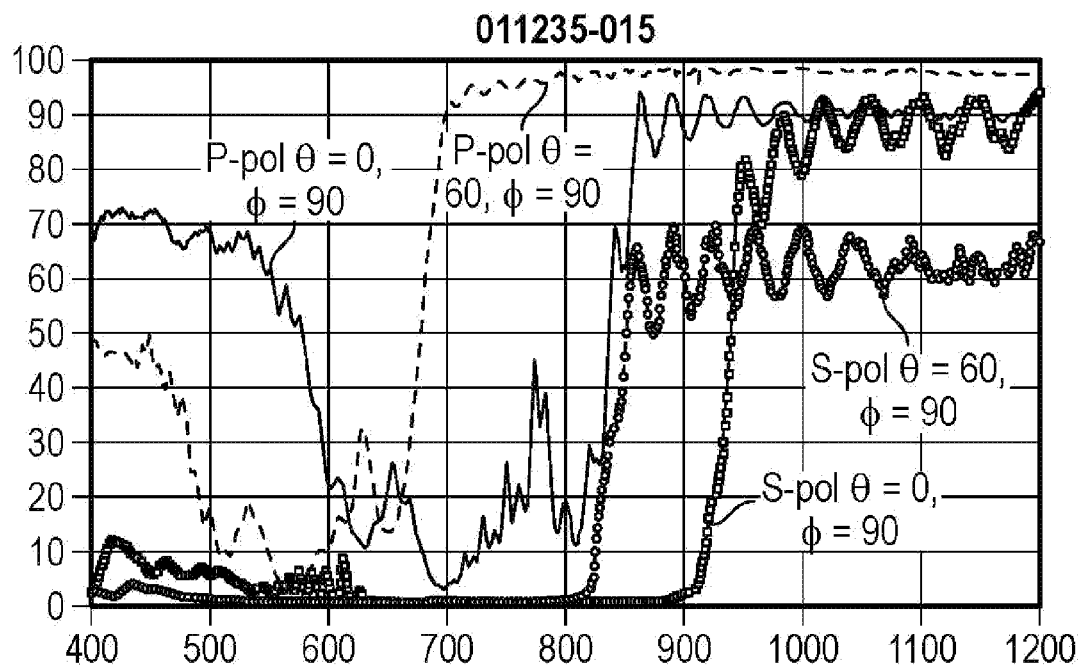
FIGS. 10A and 10B shows the measured transmission spectra and layer thickness profile, respectively, for a second example multilayer optical film, in accordance with embodiments described herein.
Figure 10B:
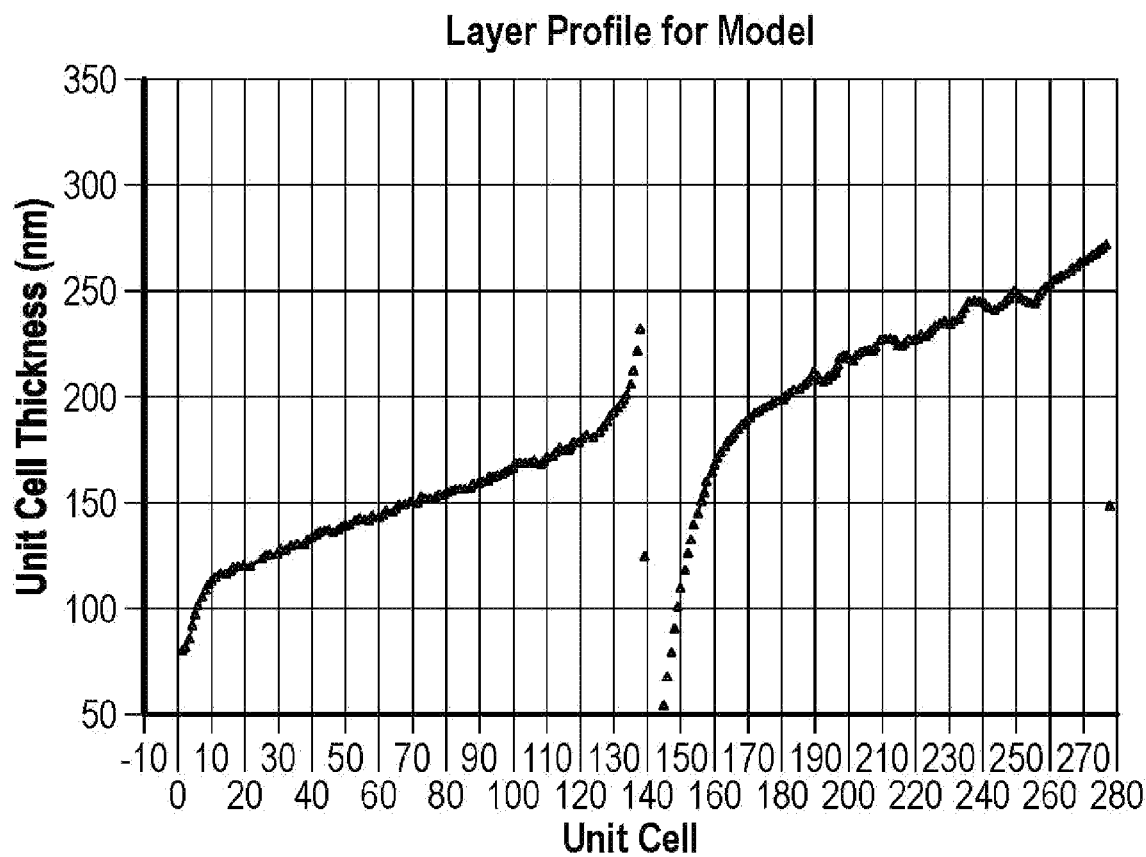

Representative measure spectra for Example Film 2 were measured and are displayed in FIG. 10A. A coordinate system reference diagram is presented in FIG. 15. The layer thickness profile for the microlayer pairs (Packet 1: Σ Thickness-A, Thickness-B, Packet 2: Σ Thickness-A, Thickness-C), in each of the two packets is shown in FIG. 10B.

Example Film 3. A multilayer optical film was manufactured with packets of microlayers, with 275 individual microlayers layers in the packet. The microlayers in each packet were arranged as alternating layers of material A and material B. Material A is a birefringent polyester Low Melt Point PEN (90% polyethylene naphthalate, 10% polyethylene terephthalate), and material B is an amorphous blend of Polycarbonate (PC) and an amorphous polyester PCTg, in the ratio 80:20, termed Hebron. The Hebron was, in turn, blended with PETg (GN017) in the ratio of 85:15. The microlayer packet is designed to have a reflection band that spans the regions of visible and near-IR wavelengths.

The process conditions chosen for the manufacture of this film, resulted in wavelength-dependent refractive index values, as are shown in Table 3.

TABLE 3

| | Wavelength nm | | |
|---|---|---|---|
| | 450 | 550 | 633 |
| LmPEN | | | |
| $N_x$ | 1.907 | 1.837 | 1.811 |
| $N_y$ | 1.629 | 1.595 | 1.584 |
| $N_z$ | 1.591 | 1.558 | 1.547 |
| Hebron:GN071 (80:20) | | | |
| $N_{iso}$ | 1.596 | 1.578 | 1.570 |

The extrusion settings for the manufacture of this film were set to provide a phase thickness ratio of a LmPEN microlayer, relative to the sum of the phase thickness of the same LmPEN microlayer plus its Hebron/PETg microlayer pair, of 50%, when calculated using the refractive index set from Table 3 for the x-axis (transverse to machine axis) at 633 nm.

Figure 11A:
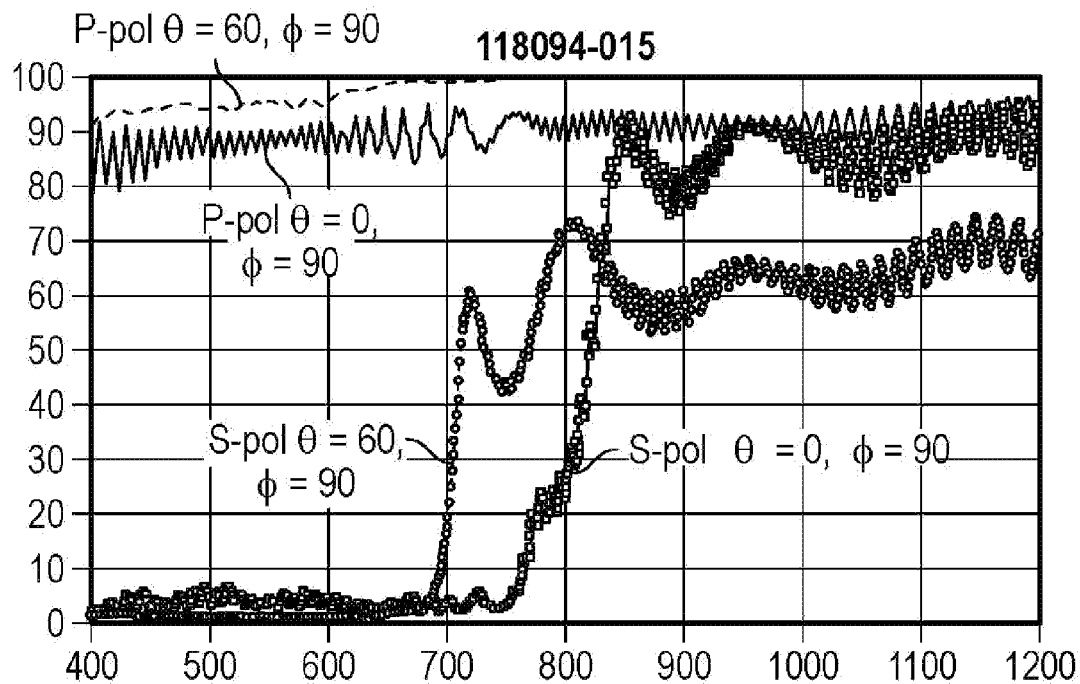
FIGS. 11A and 11B shows the measured transmission spectra and layer thickness profile, respectively, for a third example multilayer optical film, in accordance with an embodiment described herein.
Figure 11B:
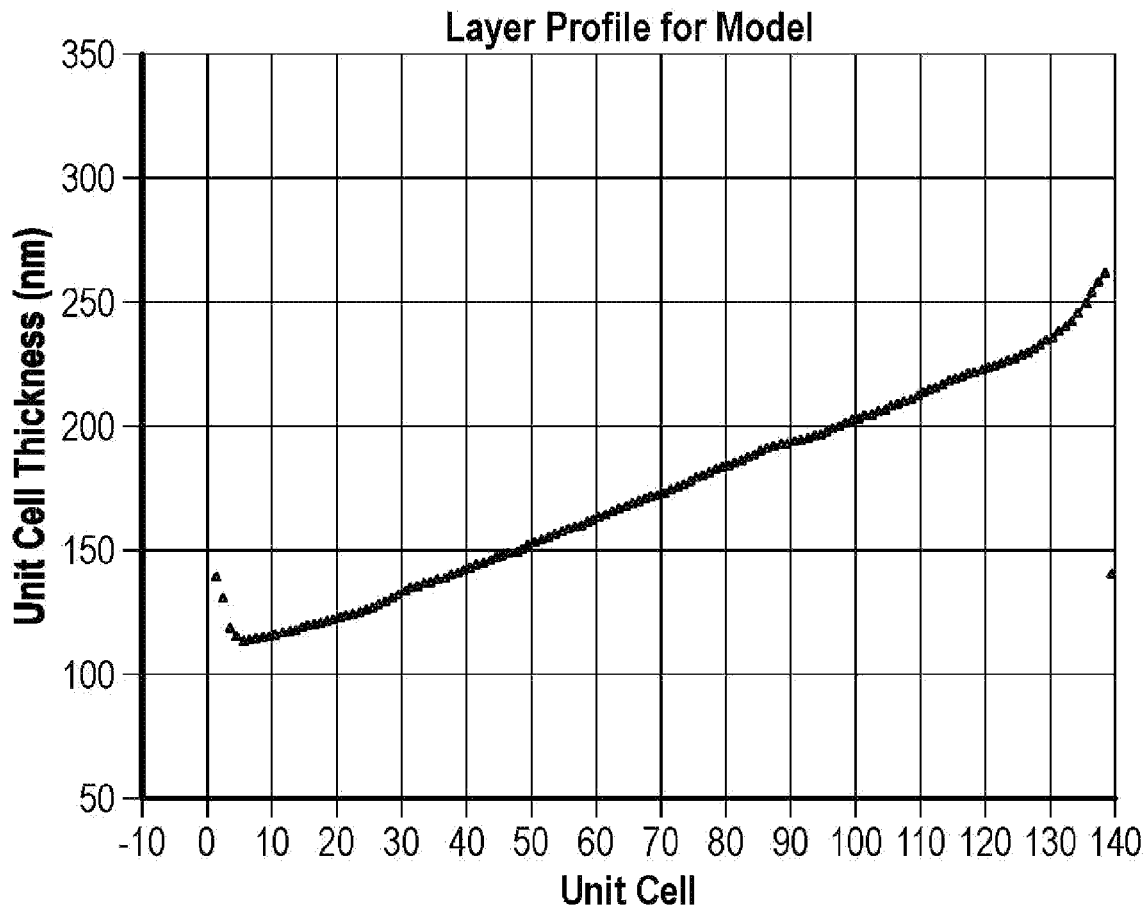

Representative measure spectra for Example Film 3 were measured and are displayed in FIG. 11A. A coordinate system reference diagram is presented in FIG. 15. The layer thickness profile for the microlayer pairs (ΣThickness-A, Thickness-B), for the single packet is shown in FIG. 11B.

Example Film 4. A multilayer optical film was manufactured with a single packet of microlayers, with 184 individual microlayers layers in the packet. The microlayers in the packet are arranged as alternating layers of material A and material B. Material A is a birefringent polyester Low Melt Point PEN (90% polyethylene naphthalate, 10% polyethylene terephthalate), and material B is an amorphous blend of Polycarbonate (PC) and an amorphous polyester PCTg, in the ratio 80:20, termed Hebron. The Hebron was, in turn, blended with PETg (GN017) in the ratio of 85:15. The microlayer packet was designed to have a reflection band that spans the regions of visible and near-IR wavelengths.

The process conditions chosen for the manufacture of this film, resulted in wavelength-dependent refractive index values, as are shown in the Table 4.

TABLE 4

| | Wavelength nm | | |
|---|---|---|---|
| | 450 | 550 | 633 |
| LmPEN | | | |
| $N_x$ | 1.913 | 1.843 | 1.817 |
| $N_y$ | 1.629 | 1.595 | 1.584 |
| $N_z$ | 1.591 | 1.558 | 1.547 |
| Hebron:GN071 (80:20) | | | |
| $N_{iso}$ | 1.596 | 1.578 | 1.570 |

The extrusion settings for the manufacture of this film where set to provide a phase thickness ratio of a LmPEN microlayer, relative to the sum of the phase thickness of the same LmPEN microlayer plus its Hebron/PETg microlayer pair, of 50%, when calculated using the refractive index set from Table 4 for the x-axis (transverse to machine axis) at 633 nm.

Figure 12A:
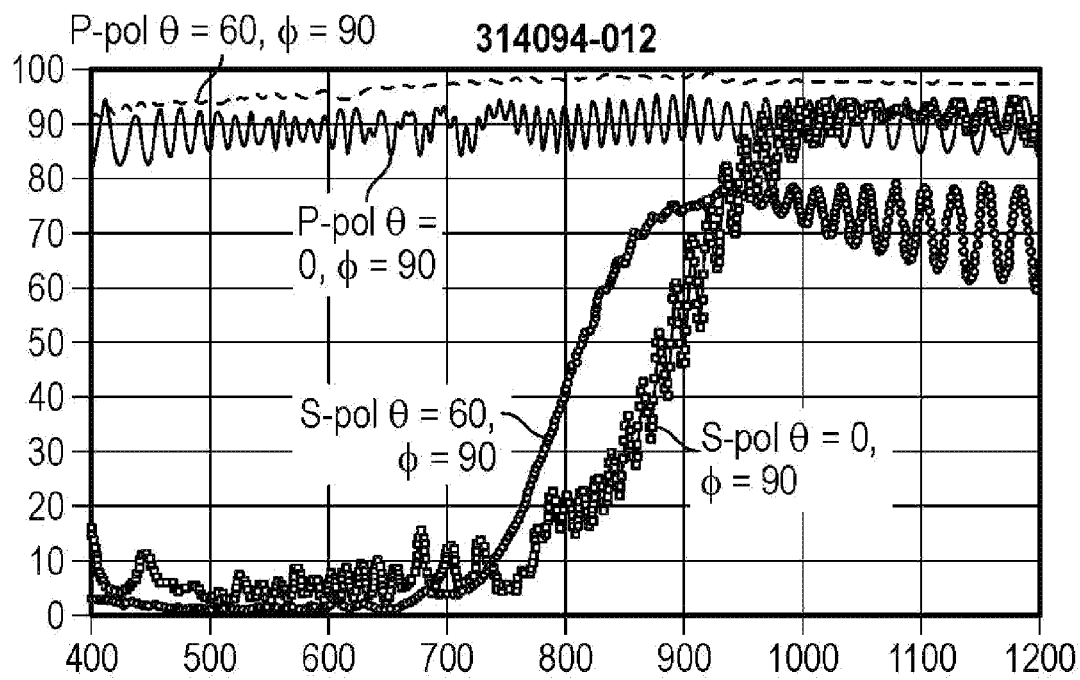
FIGS. 12A and 12B shows the measured transmission spectra and layer thickness profile, respectively, for a fourth example multilayer optical film, in accordance with an embodiment described herein.
Figure 12B:
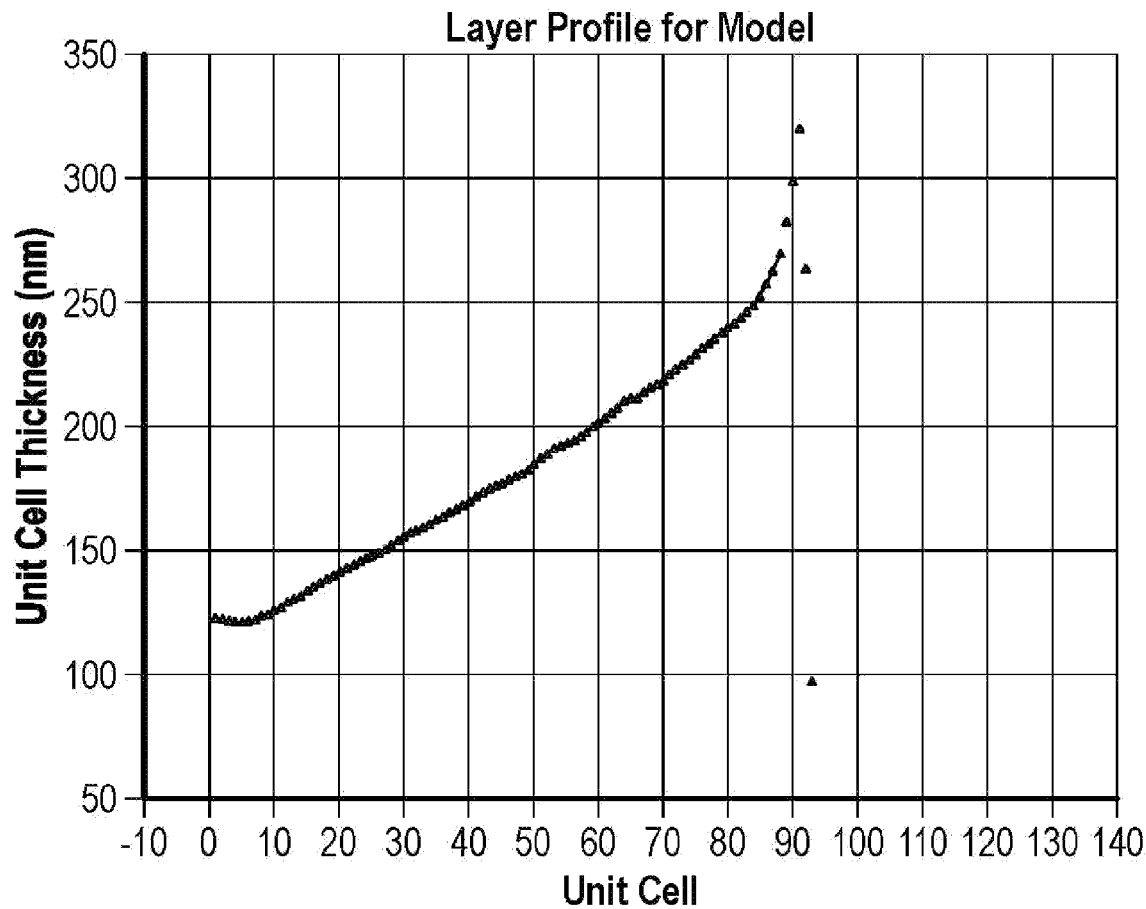

Representative measure spectra for Example Film 4 were measured and are displayed in FIG. 12A. A coordinate system reference diagram is presented in FIG. 15. The layer thickness profile for the microlayer pairs (ΣThickness-A, Thickness-B), for the single packet is shown in FIG. 12B.

Table 5 below shows the measured modulation transfer function values of several example films and film stacks under different conditions, and illuminated by near-infrared light. The resolution and performance of an optical system, such as the optical stacks described herein, can be characterized using a modulation transfer function. The modulation transfer function (MTF) provides a measurement of the ability of a film or optical stack to transfer image contrast information (or image detail) from the original image to the destination plane (e.g., a surface of an imaging sensor, such as an infrared camera) as a virtual image at a specific resolution.

Figure 14:
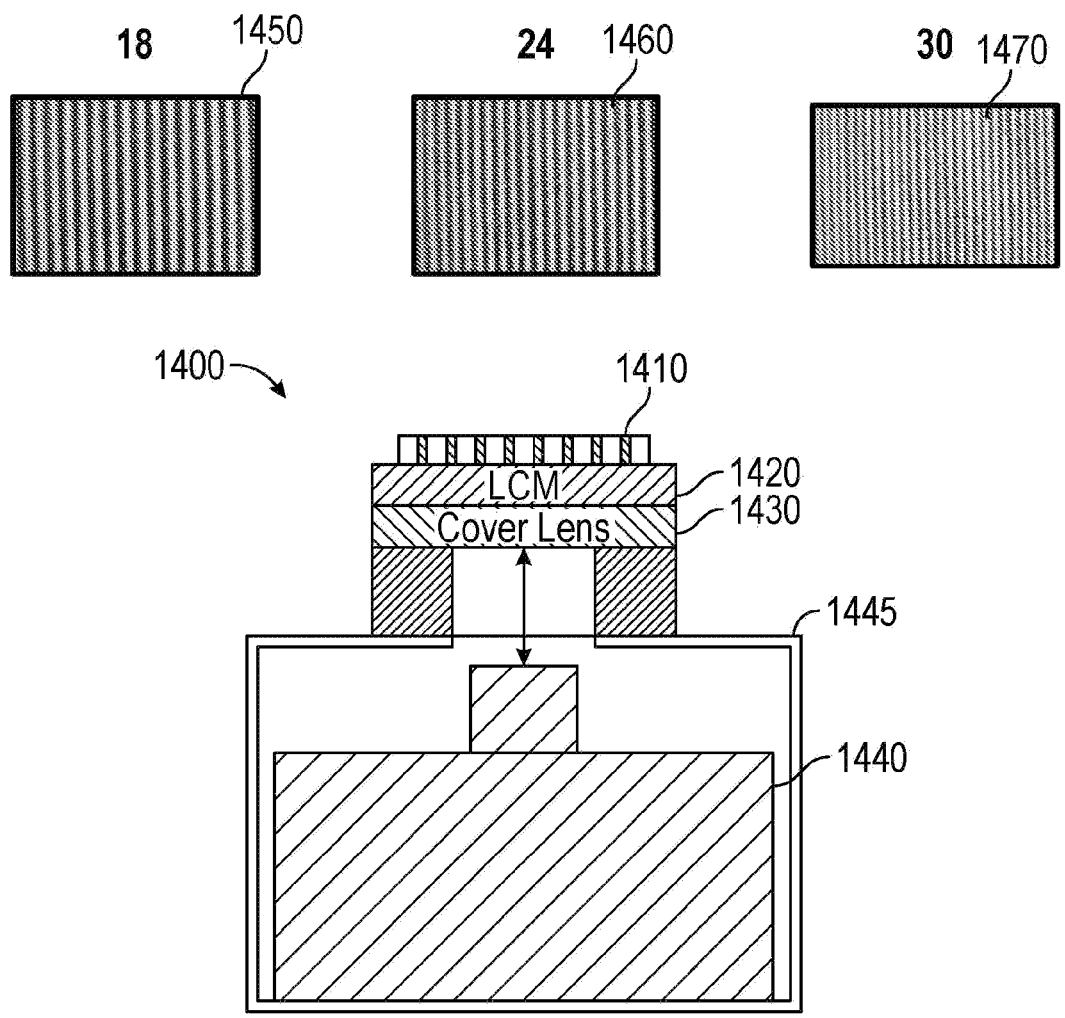
FIG. 14 shows an example test set up used to measure the modulation transfer function values of FIG. 13, in accordance with an embodiment described herein.
Figure 15:
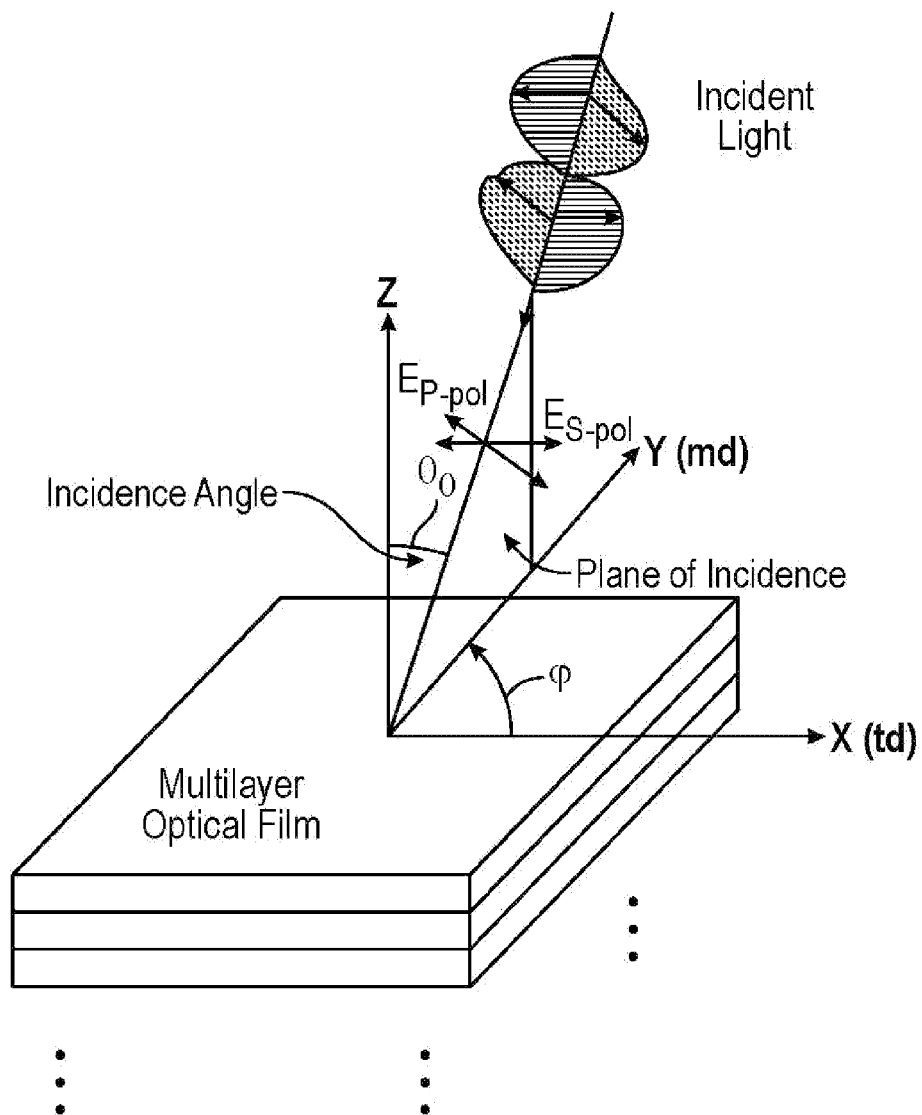
FIG. 15 provides a coordinate system reference chart for the example films and measurement results discussed herein.

The MTF values for several films and optical stacks was determined as follows. A measuring system, such as the system shown in FIG. 14, was set up in a lab under controlled conditions. It should be noted that the test set up shown in FIG. 14 is meant for illustration purposes and is not intended to be limiting. In the embodiment shown in FIG. 14, a test fixture 1445 was set up with an infrared camera 1440. Various line resolution test cards 1410 were placed over the aperture at the top of test fixture 1445. In some examples, a line resolution test card 1410 was placed over the aperture alone to determine a base reading without any films or stacks present. In other examples, additional layers were placed over the aperture along with the line resolution test card 1410. In the example set up shown in FIG. 14, a liquid crystal module (LCM) 1420 and a cover lens 1430 were added to the testing stack. A description of the stack components for each performed test are given in Table 5.

Each line resolution test card 1410 has a sequence of line pairs (alternating "stripes" of black and white) at a different spatial frequency. Three example line resolution test cards 1410 are shown in FIG. 14 for illustration purposes. For example, line resolution test card 1450 has a spatial frequency of 2.2 line pairs per millimeter (mm), line resolution test card 1460 has a spatial frequency of 3.1 line pairs per mm, and line resolution test card 1470 has a spatial frequency of 3.9 line pairs per mm. These are the specific line resolution test cards 1410 used in the testing recorded here.

MTF measurements were determined as follows. First, using the test fixture 1445 of FIG. 14, a reading of the minimum (min) and maximum (max) gray scale values was taken for each tested stack. A value of the modulation M for a base line (for a line resolution test card 1410 only with no stack) was then calculated for each of the spatial frequencies, using the formula M=(max−min)/(max+min). Then a modulation value, M', was calculated in the same way for each of the tested stacks. The MTF value was then determined to be the ratio M'/M. Table 5 shows the results of the measurements for several film/film stacks at each of the three spatial resolutions.

TABLE 5

| | | Card # | | | | | |
|---|---|---|---|---|---|---|---|
| | | 18 | | | | 24 | |
| | | Spatial Frequency | | | | | |
| | | 2.2 | | | | 3.1 | |
| | | min | max | M' | M'/M | min | max |
| | Base Line | 37.442 | 204.534 | 0.69 | | 37 | 203.667 |
| Single Film | CMOF004 | 36.667 | 185 | 0.67 | 0.969 | 40.333 | 194.667 |
| | APFv3 | 39.333 | 210.333 | 0.68 | 0.992 | 38.333 | 196 |
| | Camo diffuser | 67 | 213 | 0.52 | 0.755 | 59 | 201 |
| | NSR | 40 | 202.667 | 0.67 | 0.971 | 45 | 219.667 |
| Prior Art | UDF35 | 136.333 | 156.333 | 0.07 | 0.099 | 132 | 145.333 |
| | TBEF2-DT (prisms 90 d to card lines) | 103.333 | 175 | 0.26 | 0.373 | 111 | 186.333 |
| | BEF4-DML (prisms 90 d to card lines) | 114 | 184.667 | 0.24 | 0.343 | 97.333 | 161.333 |
| | BEF4-DMH (prisms 90 d to card lines) | 114.333 | 194 | 0.26 | 0.374 | 70.333 | 85.667 |
| LCM | NSR + Camo diffuser + APF | 73.786 | 176.667 | 0.41 | 0.595 | 92.331 | 163.248 |
| | NSR + Camo diffuser + CMOF004 | 80.757 | 189.631 | 0.40 | 0.583 | 90.333 | 183.333 |
| | NSR + Camo diffuser + CMOF004 + APF | 64.239 | 154.233 | 0.41 | 0.597 | 104.519 | 186.333 |
| | NSR + Camo diffuser + APF + APF | 55.222 | 135.45 | 0.42 | 0.609 | 76.333 | 153.333 |
| Film Stack | NSR + Camo | 77 | 167.333 | 0.37 | 0.535 | 78.667 | 162.667 |
| | NSR + Camo + 004(0 d) + APF | 57 | 121.667 | 0.36 | 0.524 | 82 | 156 |
| | NSR + Camo + 004(15 d) + APF | 75.667 | 164 | 0.37 | 0.534 | 74.667 | 147 |
| | NSR + Camo + 004(30 d) + APF | 86.667 | 179 | 0.35 | 0.503 | 74 | 154.333 |
| | NSR + Camo + 004(45 d) + APF | 67.667 | 150.333 | 0.38 | 0.549 | 77 | 167.667 |
| | NSR + Camo + 004 | 80 | 155.667 | 0.32 | 0.465 | 81 | 161 |
| | NSR + Camo + 015 | 82.667 | 173.333 | 0.35 | 0.513 | 82.333 | 157.333 |
| | NSR + Camo + APF(0 d) + APF | 91 | 185 | 0.34 | 0.493 | 83 | 156 |
| | NSR + Camo + APF(15 d) + APF | 82.333 | 170 | 0.35 | 0.503 | 90 | 177.667 |
| | NSR + Camo + APF(30 d) + APF | 73 | 162.667 | 0.38 | 0.551 | 74.333 | 164.333 |
| | NSR + Camo + APF(45 d) + APF | 76 | 171.333 | 0.39 | 0.558 | 84.333 | 173 |
| | NSR + Camo + APF | 90 | 195.333 | 0.37 | 0.535 | 79.667 | 178.333 |

TABLE 5-continued

| | | Card # | | | | | |
|---|---|---|---|---|---|---|---|
| | | 24 | | 30 | | | |
| | | Spatial Frequency | | | | | |
| | | 3.1 | | 3.9 | | | |
| | | M' | M'/M | min | max | M' | M'/M |
| | Base Line | 0.69 | | 43.369 | 225.515 | 0.68 | |
| Single Film | CMOF004 | 0.66 | 0.948 | 38.101 | 172.384 | 0.64 | 0.942 |
| | APFv3 | 0.67 | 0.972 | 49 | 217.667 | 0.63 | 0.934 |
| | Camo diffuser | 0.55 | 0.789 | 64.625 | 211.92 | 0.53 | 0.786 |
| | NSR | 0.66 | 0.953 | 46.667 | 221.333 | 0.65 | 0.962 |
| Prior Art | UDF35 | 0.05 | 0.069 | 152 | 160.333 | 0.03 | 0.039 |
| | TBEF2-DT (prisms 90 d to card lines) | 0.25 | 0.366 | 122 | 183 | 0.20 | 0.295 |
| | BEF4-DML (prisms 90 d to card lines) | 0.25 | 0.357 | 159 | 208.333 | 0.13 | 0.198 |
| | BEF4-DMH (prisms 90 d to card lines) | 0.10 | 0.142 | 123.333 | 134.667 | 0.04 | 0.065 |
| LCM | NSR + Camo diffuser + APF | 0.28 | 0.401 | 105.632 | 170.434 | 0.23 | 0.347 |
| | NSR + Camo diffuser + CMOF004 | 0.34 | 0.491 | 99.826 | 171.741 | 0.26 | 0.391 |
| | NSR + Camo diffuser + CMOF004 + APF | 0.28 | 0.406 | 111.097 | 177.486 | 0.23 | 0.340 |
| | NSR + Camo diffuser + APF + APF | 0.34 | 0.484 | 77.333 | 140.778 | 0.29 | 0.429 |
| Film Stack | NSR + Camo | 0.35 | 0.503 | 78 | 158 | 0.34 | 0.500 |
| | NSR + Camo + 004(0 d) + APF | 0.31 | 0.449 | 82 | 167.667 | 0.34 | 0.507 |
| | NSR + Camo + 004(15 d) + APF | 0.33 | 0.471 | 73.333 | 141 | 0.32 | 0.466 |
| | NSR + Camo + 004(30 d) + APF | 0.35 | 0.508 | 82 | 168.667 | 0.35 | 0.510 |
| | NSR + Camo + 004(45 d) + APF | 0.37 | 0.535 | 89 | 174.333 | 0.32 | 0.478 |
| | NSR + Camo + 004 | 0.33 | 0.477 | 79.333 | 165.333 | 0.35 | 0.519 |
| | NSR + Camo + 015 | 0.31 | 0.452 | 82 | 166.333 | 0.34 | 0.501 |
| | NSR + Camo + APF(0 d) + APF | 0.31 | 0.441 | 78 | 155.333 | 0.33 | 0.489 |
| | NSR + Camo + APF(15 d) + APF | 0.33 | 0.473 | 72 | 154.333 | 0.36 | 0.537 |
| | NSR + Camo + APF(30 d) + APF | 0.38 | 0.545 | 90 | 181.333 | 0.34 | 0.497 |
| | NSR + Camo + APF(45 d) + APF | 0.34 | 0.498 | 76.333 | 162 | 0.36 | 0.531 |
| | NSR + Camo + APF | 0.38 | 0.552 | 71 | 159 | 0.38 | 0.565 |

The terms used in Table 5 are generally defined as follow: "CMOF004" is an example collimating multilayer optical film, "APFv3" (and "APF" in general) is an example reflective polarizer, "Camo diffuser" is an example optical diffuser with a low scattering rate for near infrared wavelengths, "NSR" is an example reflector or enhanced specular reflector, "BEF" (including TBEF) is an example light redirecting film (such as a "brightness enhancement film"), "LCM" is an example liquid crystal module, and "UDF35" is a diffuser typical of the prior art which does not exhibit low scattering (low diffusion) in the infrared wavelengths.

Figure 13:
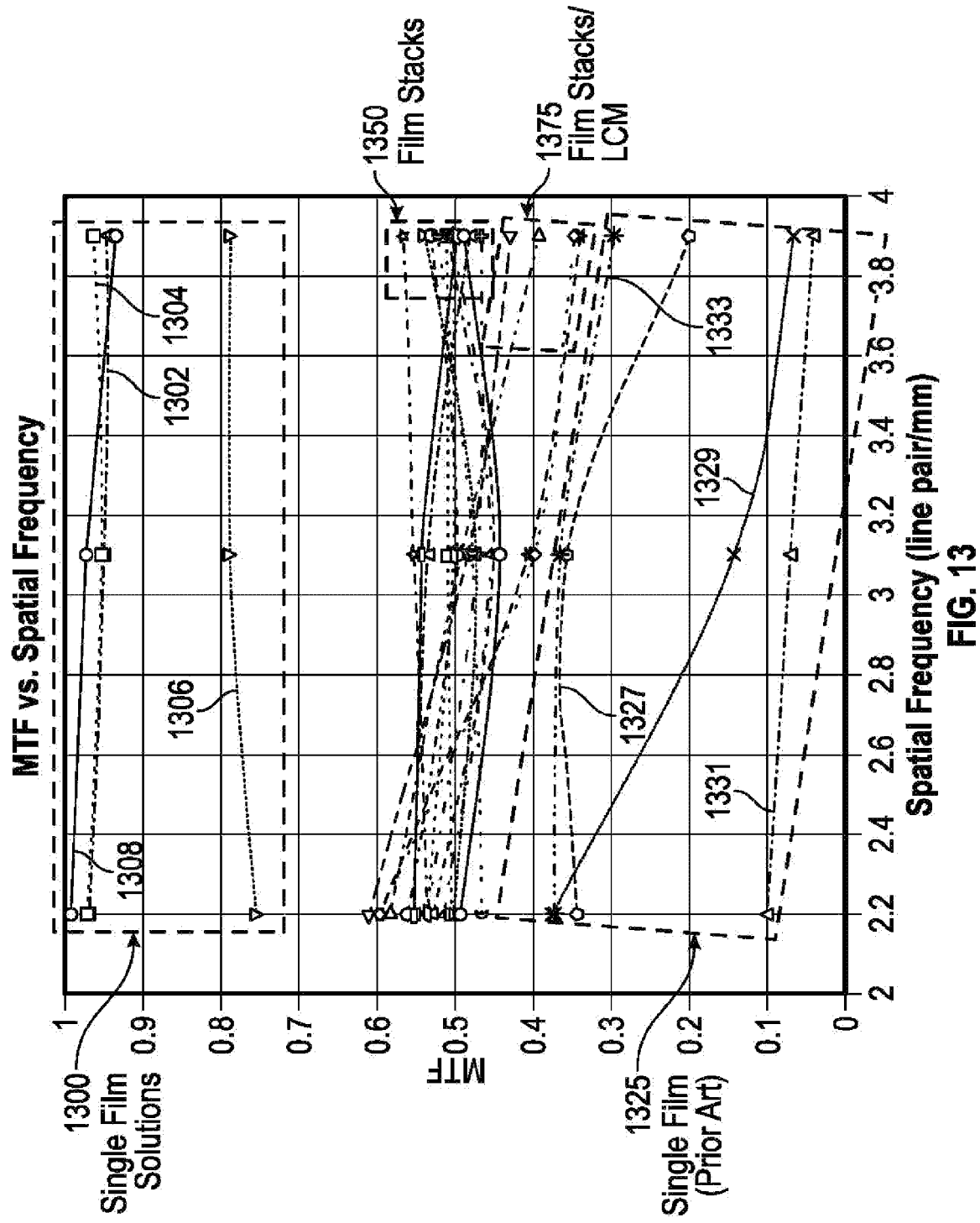
FIG. 13 shows the measured modulation transfer functions of several example films and film stacks, in accordance with an embodiment described herein.

FIG. 13 shows plots of the MTF values of tested films and film stacks shown in Table 5. The chart of FIG. 13 shows the MTF plots representing the four separate groups of Table 5, single film solutions (in accordance with embodiments of the present description) 1300, prior art single film values 1325, film stacks 1350, and film stacks paired with an LCM 1375. Each of these groups is shown with a dashed box on FIG. 13. In general, Table 5 and FIG. 13 demonstrate that single films 1300 (as described herein) show the highest MTF values for infrared image transfers, and single films from the prior art 1325 have the lowest MTF values. That is, the data shows that using diffusers and other film layers exhibiting high infrared clarity (i.e., relatively higher levels of infrared transmission and lower infrared scattering rates, such as the single films of 1300, in accordance with embodiments of the present description) provides better image transfer (higher resolution images in the infrared wavelengths) that existing single films used in the prior art.

Line 1308 of FIG. 13 represents the MTF values across the depicted spatial frequencies for a reflective polarizer (APFv3), line 1306 represents the MTF values for a camo diffuser, line 1304 represents the MTF values for a specular reflector (NSR), and line 1302 represents the MTF values for a collimating multilayer optical film (CMOF004).

Line 1333 of FIG. 13 represents the MTF values across the depicted spatial frequencies for a brightness enhancement film (TBEF2-DT), line 1331 represents the MTF values for a standard prior art diffuser (UDF35), line 1329 represents the MTF values for a second brightness enhancement film (BEF4-DML), and line 1327 represents the MTF values for a third brightness enhancement film (BEF4-DMH).

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical stack, comprising:
   an optical diffuser;
   a first reflective polarizer disposed on the optical diffuser;
   a first light redirecting film disposed between the first reflective polarizer and the optical diffuser and comprising a plurality of substantially parallel first microstructures extending along a first direction; and
   a second light redirecting film disposed between the first reflective polarizer and the optical diffuser and comprising a plurality of substantially parallel second microstructures extending along a second direction different from the first direction, such that for substantially normally incident light and for nonoverlapping first and second wavelength ranges, the first wavelength range extending at least from about 450 nm to about 600 nm, and the second wavelength range extending from about 800 nm to about 1200 nm:
   the optical diffuser has a first scattering rate R1 for at least one wavelength in the first wavelength range, and a second scattering rate R2 for at least one wavelength in the second wavelength range, R1/R2≥2, wherein each of the first and second scattering rates is a ratio of diffuse transmittance to total transmittance; and
   the first reflective polarizer transmits at least 40% of light for a first polarization state for each wavelength in the first wavelength range, reflects at least 70% of light for an orthogonal second polarization state for each wavelength in the first wavelength range, and transmits at least 40% of light for each of the first and second polarization states and for at least one wavelength in the second wavelength range.

2. The optical stack of claim 1, wherein the optical diffuser comprises a binder defining a plurality of interconnected voids therein, such that for at least one cross-section of the optical diffuser along a thickness direction thereof, the voids cover at least 20% of the at least one cross-section, the optical diffuser and the binder having respective indices of refraction nd and nb at at least one wavelength in the first wavelength range, nd<nb.

3. The optical stack of claim 1, wherein the first wavelength range extends from about 420 nm to about 650 nm.

4. The optical stack of claim 1, wherein the optical diffuser has a first average scattering rate R11 in the first wavelength range, and a second average scattering rate R22 in the second wavelength range, R11/R22>about 2, wherein each of the first and second average scattering rates is a ratio of diffuse transmittance to total transmittance.

5. The optical stack of claim 1, wherein the first reflective polarizer transmits at least 70% of light for the first polarization state for each wavelength in the first wavelength range.

6. The optical stack of claim 1, wherein the first reflective polarizer transmits at least 50% of light for each of the first and second polarization states and for the at least one wavelength in the second wavelength range.

7. The optical stack of claim 1 having a first average optical haze H1 in the first wavelength range and a second average optical haze H2 in the second wavelength range, H1/H2>about 1.5.

8. The optical stack of claim 1, wherein for substantially normally incident light, each of the first and second light redirecting films absorbs less than about 10% of the incident light for each of the first and second wavelength ranges.

9. The optical stack of claim 1, such that for the first wavelength range and for light incident at an incident angle with respect to a direction perpendicular to the first reflective polarizer, the first reflective polarizer has an average optical transmission T0 when the incident angle is about zero degree, and an average optical transmittance T60 when the incident angle is about 60 degrees, T60/T0<about 0.8.

10. A backlight comprising:
    a back reflector;
    the optical stack of claim 1 disposed on the back reflector; and
    a lightguide disposed between the back reflector and the optical stack, such that for substantially normally incident light and for each of the first and second polarization states, the back reflector reflects at least 70% of light for each wavelength in the first wavelength range, and transmits at least 70% of light for each wavelength in the second wavelength range.

11. A display comprising the backlight of claim 10 disposed between a liquid crystal panel and an infrared-sensitive detector, such that when an infrared emitting source emitting light in the second wavelength range is disposed proximate the liquid crystal panel, the infrared-sensitive detector detects at least some of the light emitted by the infrared emitting source in the second wavelength range.

12. A display comprising the backlight of claim 10 and configured to form a first image in the first wavelength range for viewing by a viewer, and a second image in the second wavelength range detectable by an infrared-sensitive camera.

* * * * *